(12) United States Patent
Campbell

(10) Patent No.: US 9,918,422 B2
(45) Date of Patent: Mar. 20, 2018

(54) DEVICE AND SYSTEM FOR PROVIDING AN AGRICULTURAL GROUND WORKING IMPLEMENT WITH DOWN PRESSURE AND PROTECTIVE HYDRAULIC CUSHION FOR OBSTACLE IMPACT

(71) Applicant: Joseph Campbell, Clear Spring, MD (US)

(72) Inventor: Joseph Campbell, Clear Spring, MD (US)

(*) Notice: Subject to any disclaimer, the term of this patent is extended or adjusted under 35 U.S.C. 154(b) by 358 days.

(21) Appl. No.: 14/301,303

(22) Filed: Jun. 10, 2014

(65) Prior Publication Data

US 2014/0360741 A1    Dec. 11, 2014

Related U.S. Application Data

(60) Provisional application No. 61/833,098, filed on Jun. 10, 2013.

(51) Int. Cl.
*A01B 61/04* (2006.01)

(52) U.S. Cl.
CPC ................. *A01B 61/046* (2013.01)

(58) Field of Classification Search
CPC .... A01B 61/046; A01B 63/008; A01B 63/111
See application file for complete search history.

(56) References Cited

U.S. PATENT DOCUMENTS

| 4,295,532 | A | * | 10/1981 | Williams | A01O 5/064 |
| | | | | | 111/139 |
| 4,542,793 | A | * | 9/1985 | Dietrich, Sr. | A01B 21/086 |
| | | | | | 172/180 |
| 5,421,442 | A | * | 6/1995 | Agnoff | B65G 39/12 |
| | | | | | 193/35 R |
| 8,763,713 | B2 | * | 7/2014 | Bassett | A01C 5/06 |
| | | | | | 111/135 |
| 2012/0012349 | A1 | * | 1/2012 | Van Buskirk | A01B 29/048 |
| | | | | | 172/1 |
| 2013/0312988 | A1 | * | 11/2013 | Bassett | A01B 63/111 |
| | | | | | 172/195 |

* cited by examiner

*Primary Examiner* — Thomas B Will
*Assistant Examiner* — Jessica H Lutz
(74) *Attorney, Agent, or Firm* — White-Welker & Welker, LLC; Matthew T. Welker, Esq.

(57) ABSTRACT

A pair of inner plates which are mounted to a coulter wheel by a hub bolted to the two inner plates in one end, and a bearing on an opposing end. A pair of outer plates retains the inner plates and coulter wheel while provide attachment means for a hydraulic cylinder. A hydraulic cylinder is mounted between two tabs located on outer plates and between the inner plates adjacent to the pivot bearing and opposite the coulter wheel. The hydraulic cylinder is connected to a accumulator which provides for a static down pressure. Upon impact with an obstacle, the force pushing up on the coulter wheel overcomes that of the downward static pressure and the hydraulic cylinder retracts allowing the coulter wheel to move in response to the impact force. Trash wheels are bolted to the outer plates parallel to the coulter wheel or at any desired angle.

6 Claims, 28 Drawing Sheets

DEVICE AND SYSTEM FOR PROVIDING AN AGRICULTURAL GROUND WORKING IMPLEMENT WITH DOWN PRESSURE AND PROTECTIVE HYDRAULIC CUSHION FOR OBSTACLE IMPACT

CROSS REFERENCE TO RELATED APPLICATIONS

This application claims priority from U.S. Patent Application Ser. 61/833,098, entitled "Device and System for Providing an Agricultural Ground Working Implement with Down Pressure and Protective Hydraulic Cushion for Obstacle Impact", filed on 10 Jun. 2013. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to ground working and engaging tools of a farm or agricultural implement. More specifically, the present invention relates to a system for applying a down pressure for ground working and engaging tools of a farm or agricultural implement while allowing for an upward movement in the event of contact of the implement with an obstacle.

BACKGROUND OF THE INVENTION

Farm implements that employ ground-engaging tools or implements usually need the ability to raise and lower the tools and in some circumstances require a down pressure when in a ground-engaging position so that the tool or implement can move in a constant or relative position to the ground with respect to the contour of the ground surface either on the surface or at a desired depth.

When the tools or implements include a ground penetrating work piece, it is also desirable for the tool or implement to be protected so that if the tool or implement strikes an obstacle such as a rock that may or may not be completely covered by the contour of the ground, the tool or implement can move against the downward pressure or weight of the machine frame in and upward manner to clear the obstacle without damaging the tool or implement.

SUMMARY OF THE INVENTION

The device of the present invention is shown for use on a corn planter, but can have any agricultural tool or implement attached to it for use on a wide variety of machines where the implement or tool is ground working, and could be subjected to impact forces which would lead to breakage, wherein protection or cushioning of the impact force could reduce the chances of breakage.

The device is comprised of a pair of inner plates which are removably mounted to a coulter wheel by a hub bolted to the two inner plates in one end, and a bearing on an opposing end. A pair of outer plates retains the inner plates and coulter wheel while provide attachment means for a hydraulic cylinder.

A hydraulic cylinder is removably mounted between two tabs located on outer plates and between the inner plates adjacent to the pivot bearing and opposite the coulter wheel. This hydraulic cylinder provides a static down pressure force on the inner plates and coulter wheel. The hydraulic cylinder is connected to a accumulator which provides for a static pressure, unlike spring loaded wheels which create an increasing, dynamic pressure on the wheel, and machine frame which is more likely to cause damage to the machine, wheel, or other components.

When the coulter wheel comes in contact with an obstacle such as a rock below or above the ground, the coulter wheel is forced upward as a result of the impact force and the hydraulic cylinder retracts. The force pushing up on the coulter wheel overcomes that of the downward static pressure provided by the hydraulic cylinder and accumulator. Forcing the hydraulic cylinder to retract, allowing the coulter wheel to move in response to the impact force. The coulter wheel moves up and over the obstacle without causing damage, which can occur to a fixed or spring loaded wheel.

A pivoting trash wheel arms are bolted to the outer plates using a single bolt going through the front pivot hole and bearing of the inner plates. A retaining bar bolted to the outer plate above and below the pivoting trash wheel arm limits both vertical and horizontal movement. The trash wheels are bolted to the opposing end of the pivoting trash wheel arm and pivoting retaining bolt. The trash wheels can be bolted parallel to the coulter wheel or at any desired angle.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

FIGS. 19-29 illustrate a third double wheel embodiment of the present invention where the wheels are controlled independently by individual hydraulic cylinders.

DETAILED DESCRIPTION OF THE INVENTION

Figure 1:
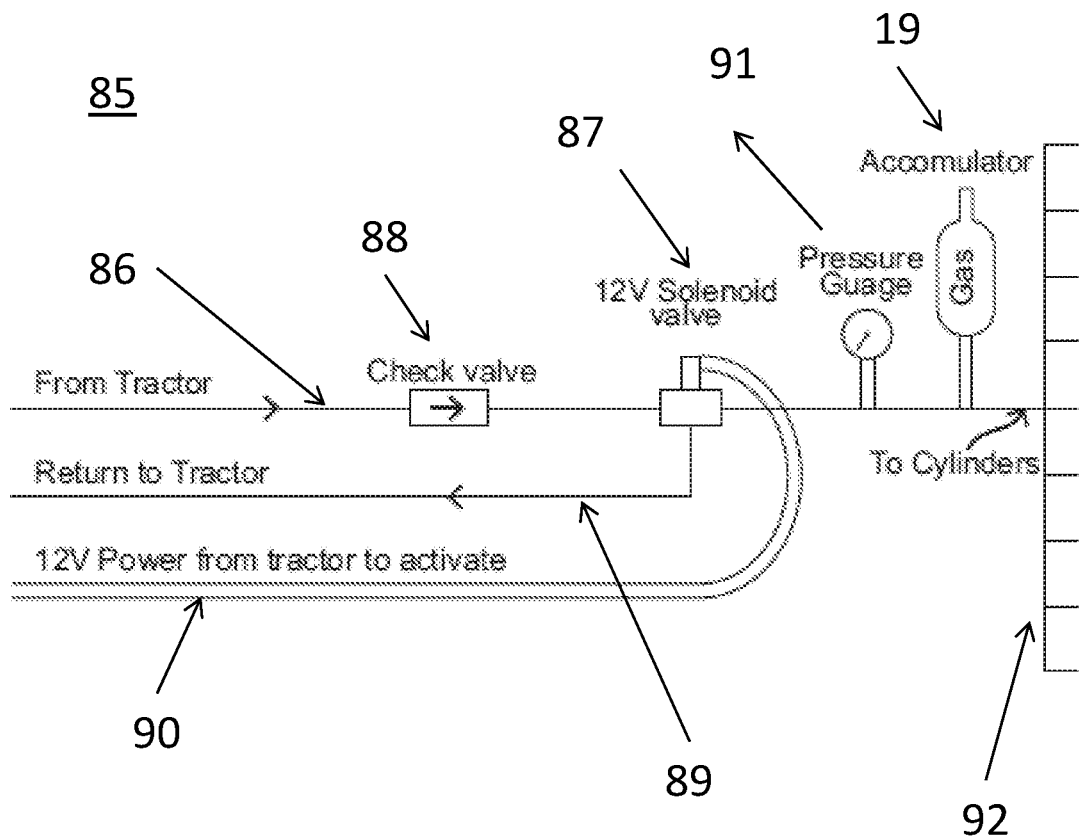
FIG. 1 illustrates a typical hydraulic system used to control the device of the present invention.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Now referring to the Figures, the embodiment of the device and system of the present invention are shown. Referring to FIGS. 2-10 and 12. The device is comprised of a pair of inner plates 1 and 2 which are removably mounted to a coulter wheel 3 by a hub 4 bolted to the two inner plates 1 and 2 on one end 5, and a pivot bearing 6 on an opposing end 7. The two inner plates 1 and 2 are retained within two outer plates 9 and 10. The two outer plates 9 and 10 are removably attached on one end 11 by a plurality of bolts 12, opposite the working surface of the coulter wheel 3 with respect to where it would contact the ground. A bolt 13 also connects the outer plates 9 and 10 through a pivot shaft 14 to the inner plates 1 and 2 on an opposing end from the coulter wheel 3.

A hydraulic cylinder 15 is removably mounted between two tabs 16 and 17 located on the outer plates 9 and 10. The opposing end of the hydraulic cylinder 18 is mounted between the inner plates 1 and 2 adjacent to the pivot bearing 6 and opposite the coulter wheel 3. This hydraulic cylinder 15 provides a static down pressure force on the inner plates 1 and 2 and coulter wheel 3. The hydraulic cylinder 15 is connected to a hydraulic accumulator 19. When the coulter wheel 3 comes in contact with an obstacle such as a rock below or above the ground, the coulter wheel 3 is forced upward as a result of the impact force and the hydraulic cylinder 15 retracts. The force pushing up on the coulter wheel 3 overcomes that of the downward static pressure provided by the hydraulic cylinder 15 and accumulator 19. The hydraulic cylinder 15 retracts allowing the coulter wheel 3 to move in response to the impact force. The coulter wheel 3 moves up and over the obstacle without causing damage, which could occur to a fixed or spring loaded wheel.

The outer plates 9 and 10 have motion limiting blocks 20 and 21 located on their inner surfaces 22 and 23. These motion limiting blocks or stops 20 and 21 are engaged by the inner plates 1 and 2 as the coulter wheel 3 rises in response to an obstacle impact. These motion limiting blocks or stops 20 and 21 limit the amount of upward motion of the trash wheel 26 so that the wheel 3 can not become damaged by the machine frame 25 in the event a large surface obstacle is encountered by the machine.

Figure 2:
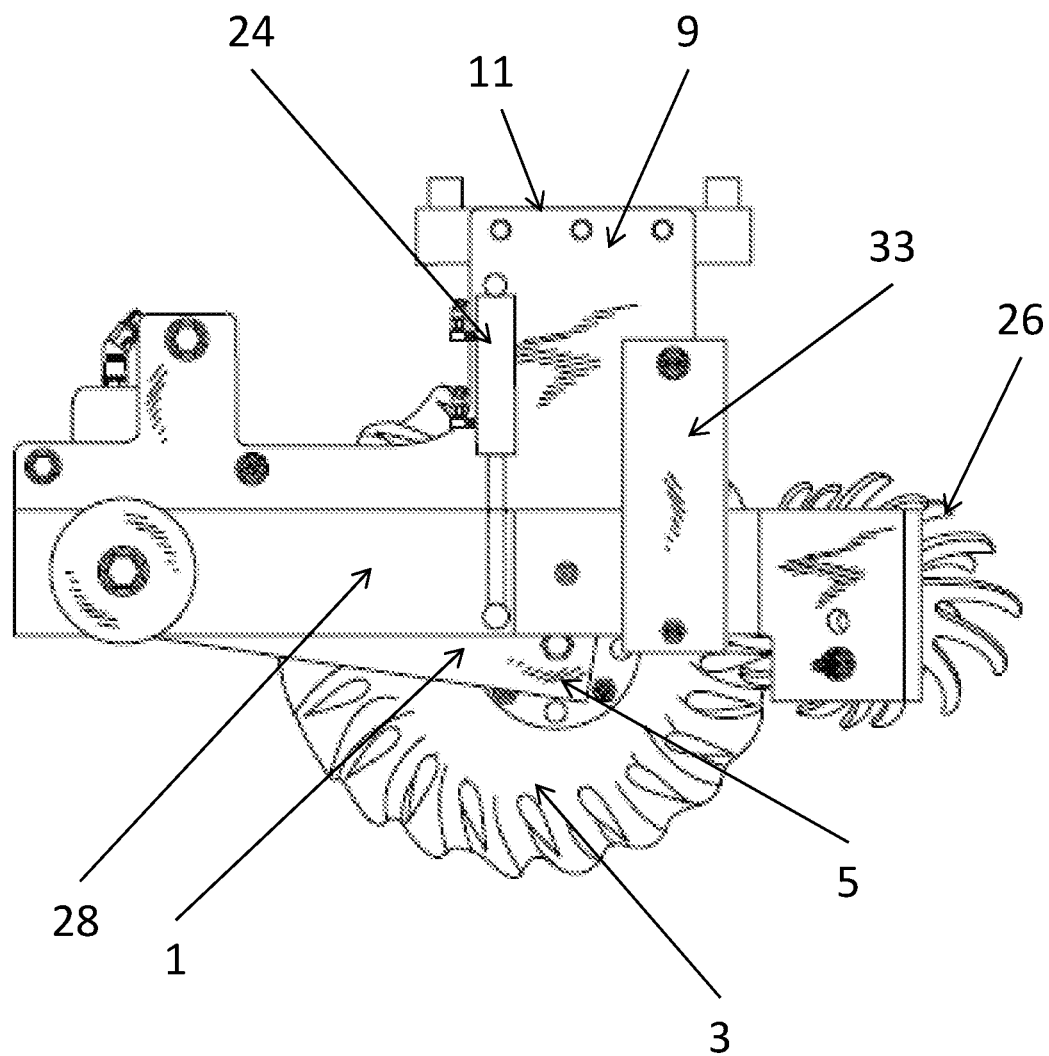
FIG. 2 is a side perspective view of the device of the present invention.
Figure 3:
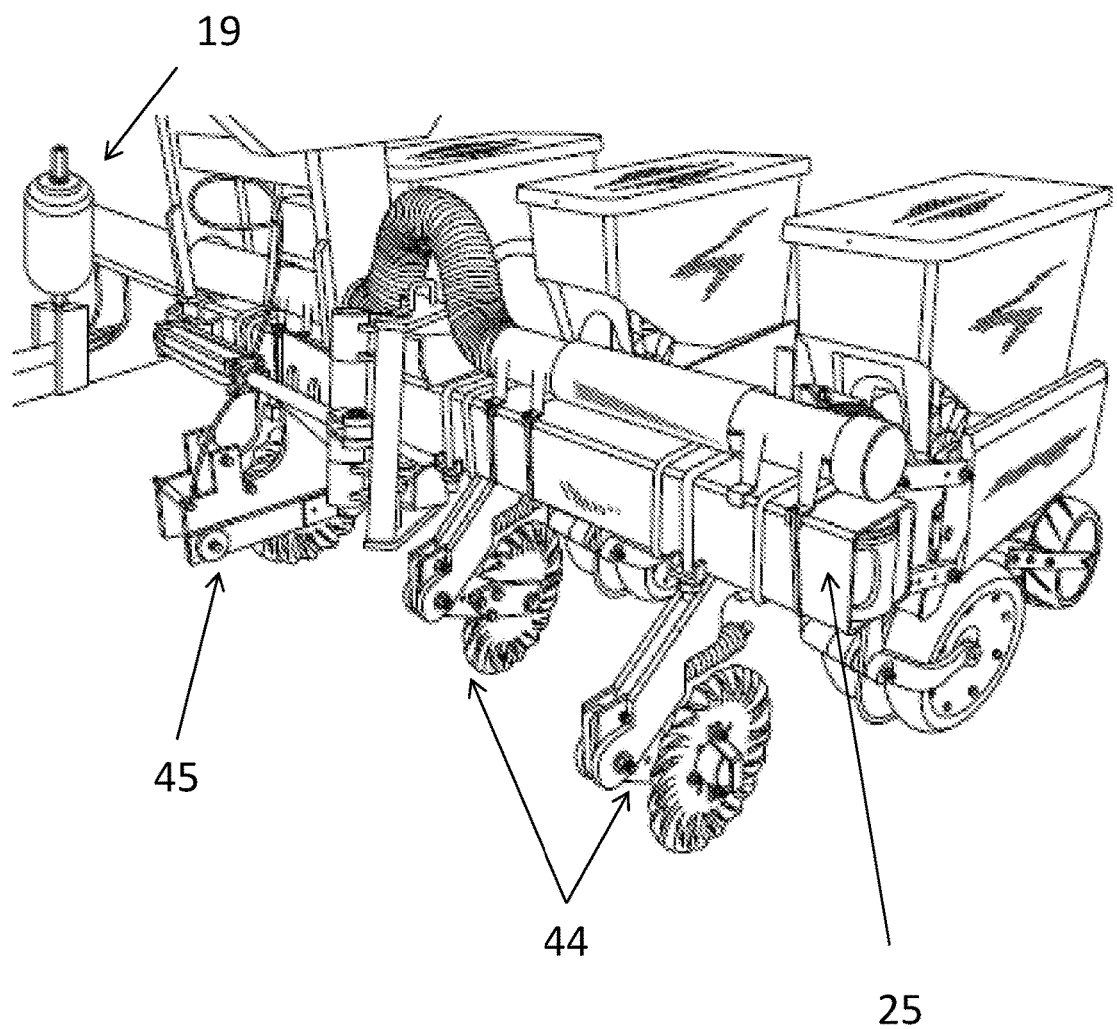
FIG. 3 illustrates a typical corn planter machine known in the prior art with spring loaded coulters, where one coulter is attached to the machine using the system of the present invention.
Figure 4:
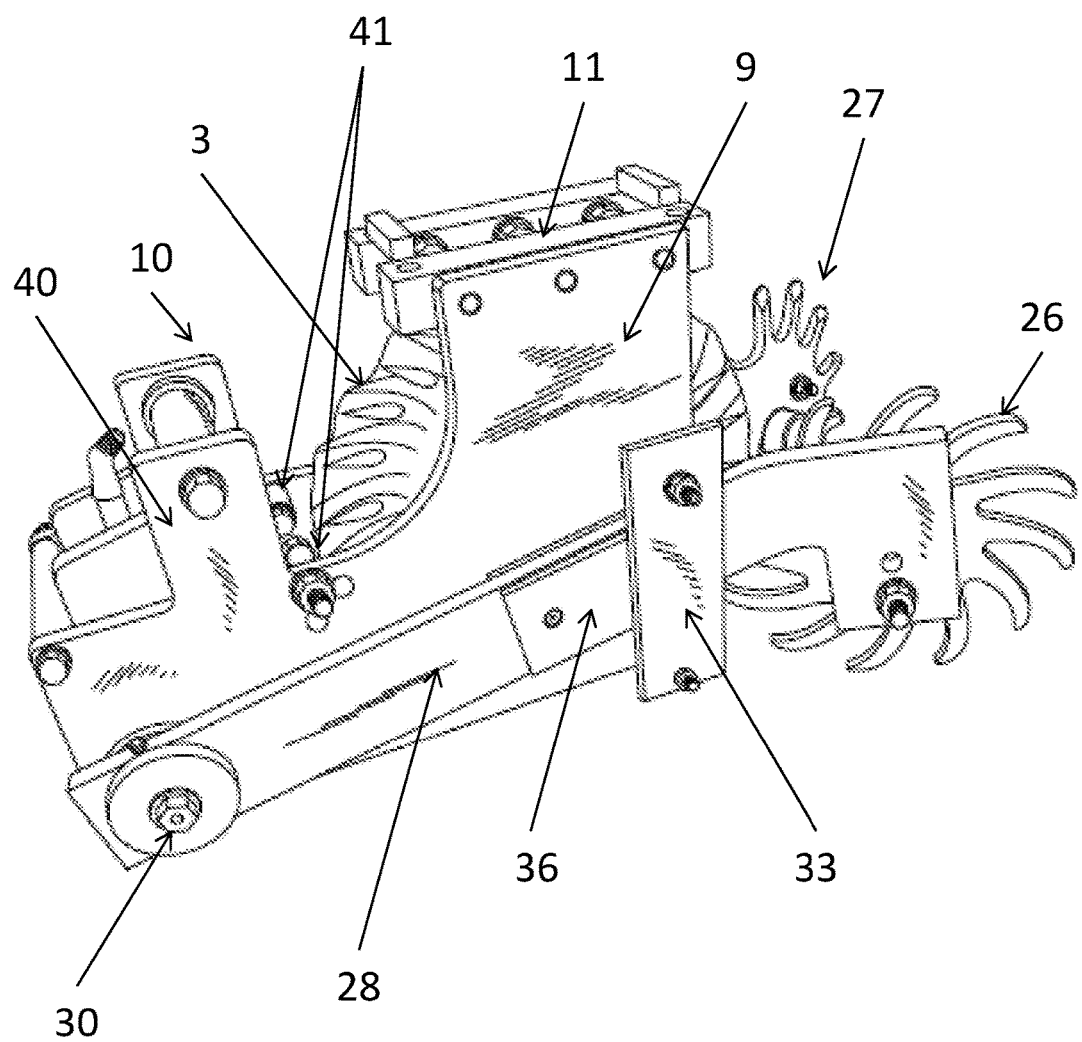
FIG. 4 is a side perspective view of the device of the present invention.
Figure 5:
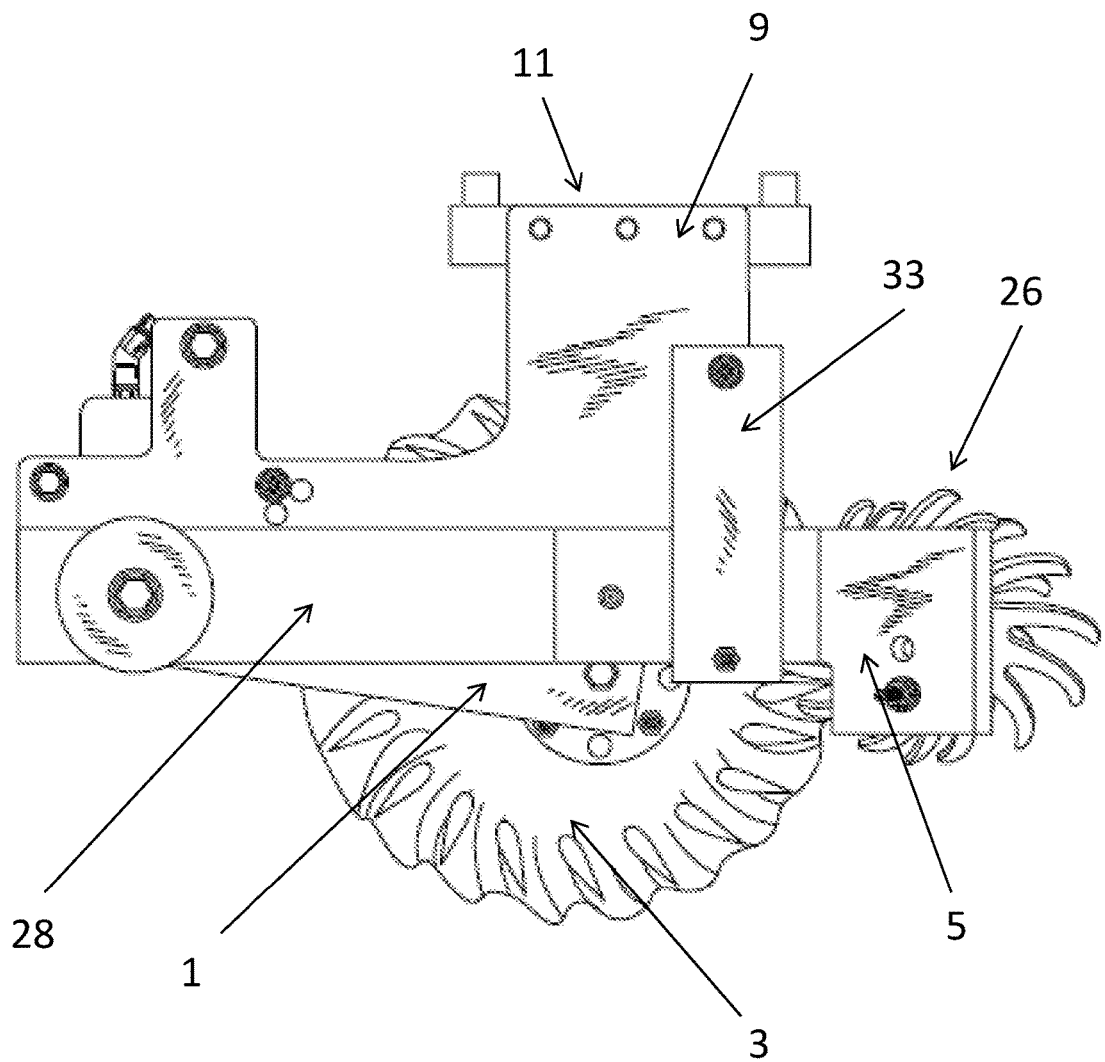
FIGS. 5-6 are side plane views of the device of the present invention.
Figure 6:
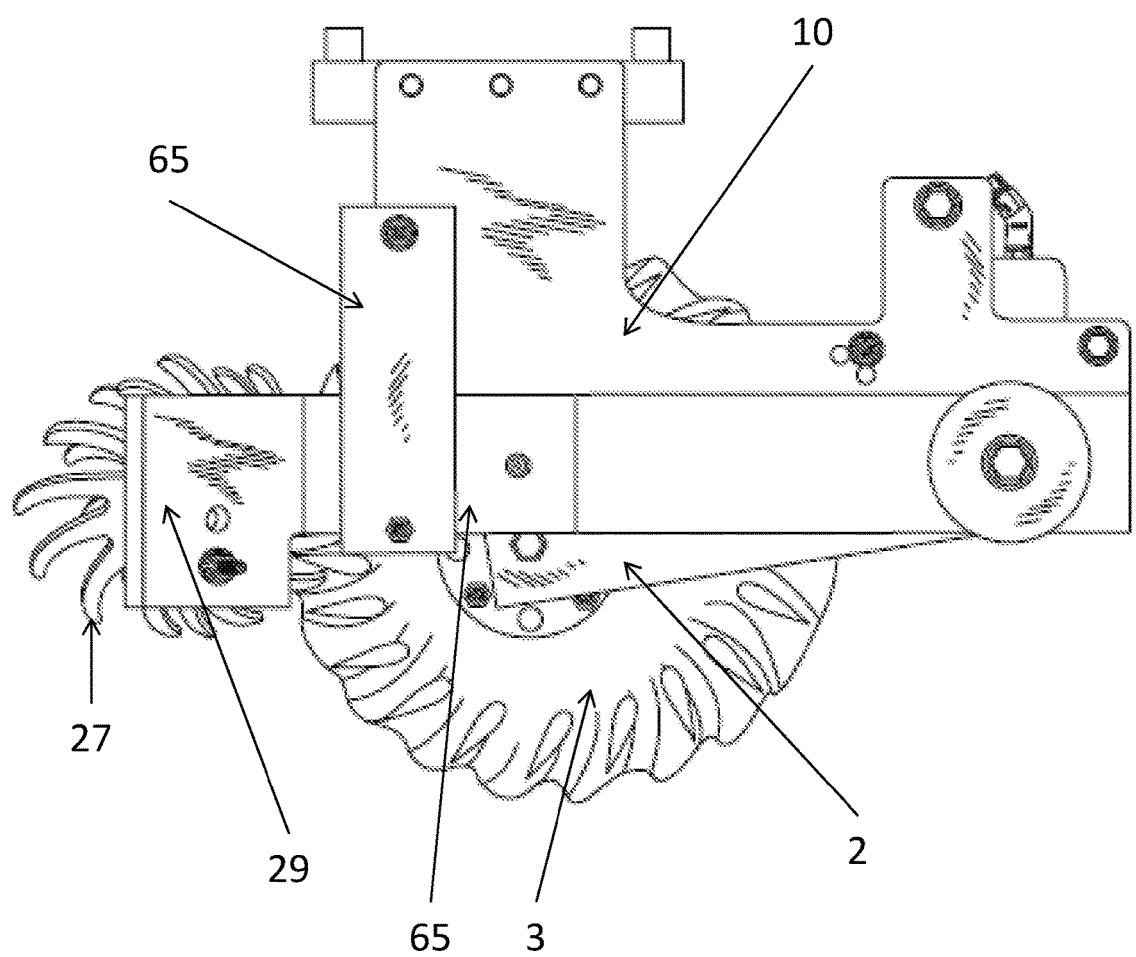
Figure 7:
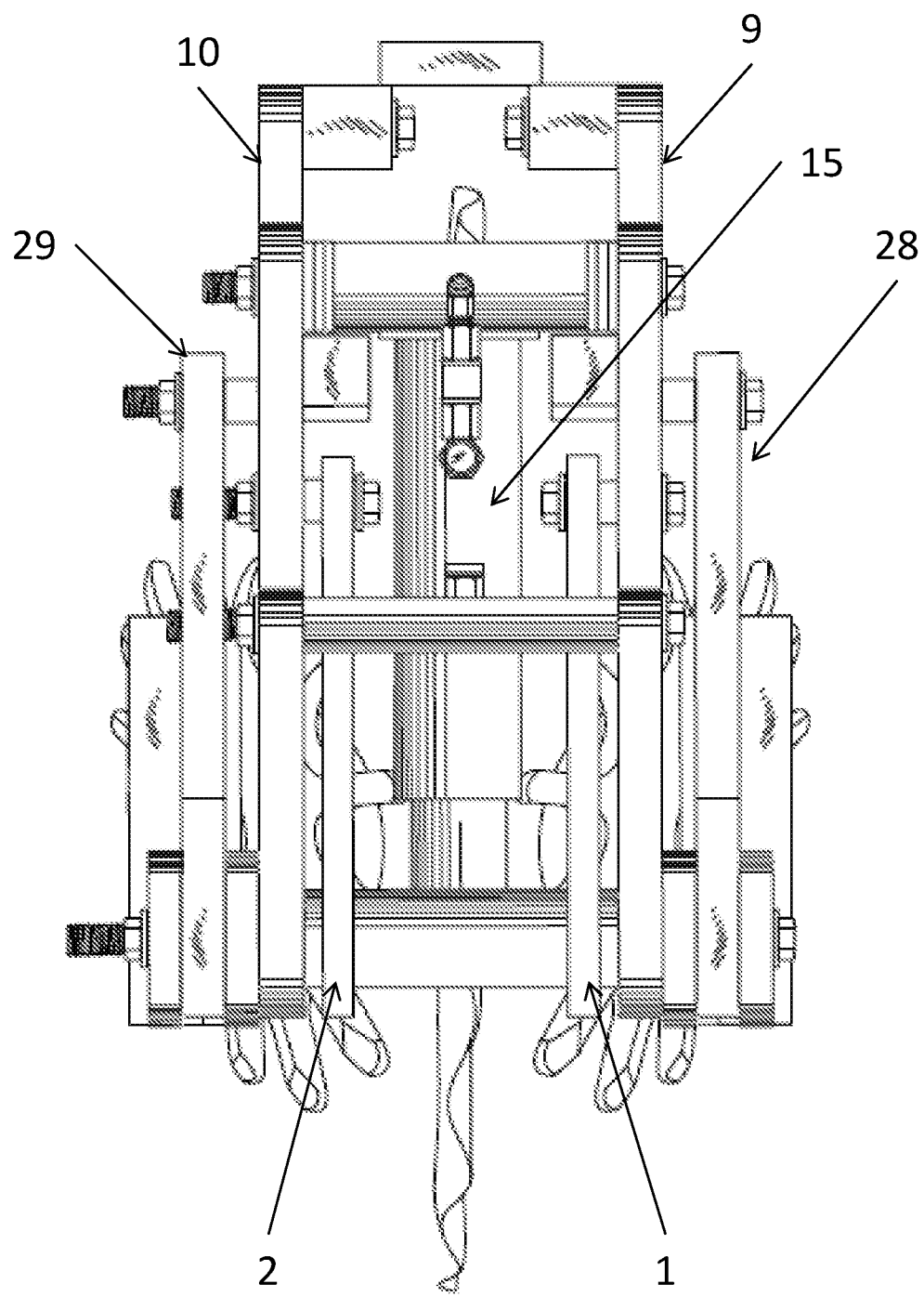
FIGS. 7 and 9 are top plane views of the device of the present invention.
Figure 8:
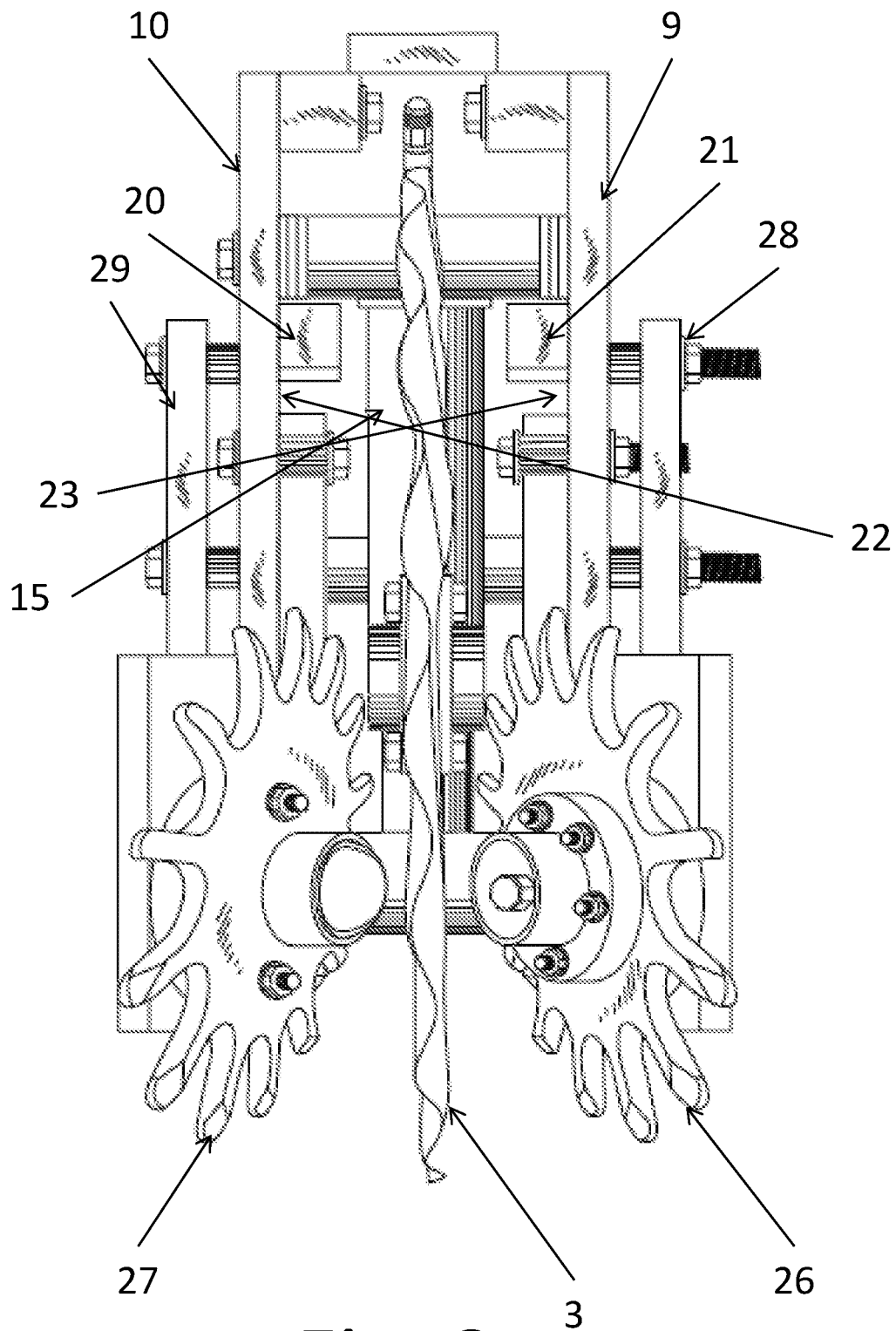
FIGS. 8 and 10 are bottom plane views of the device of the present invention.
Figure 9:
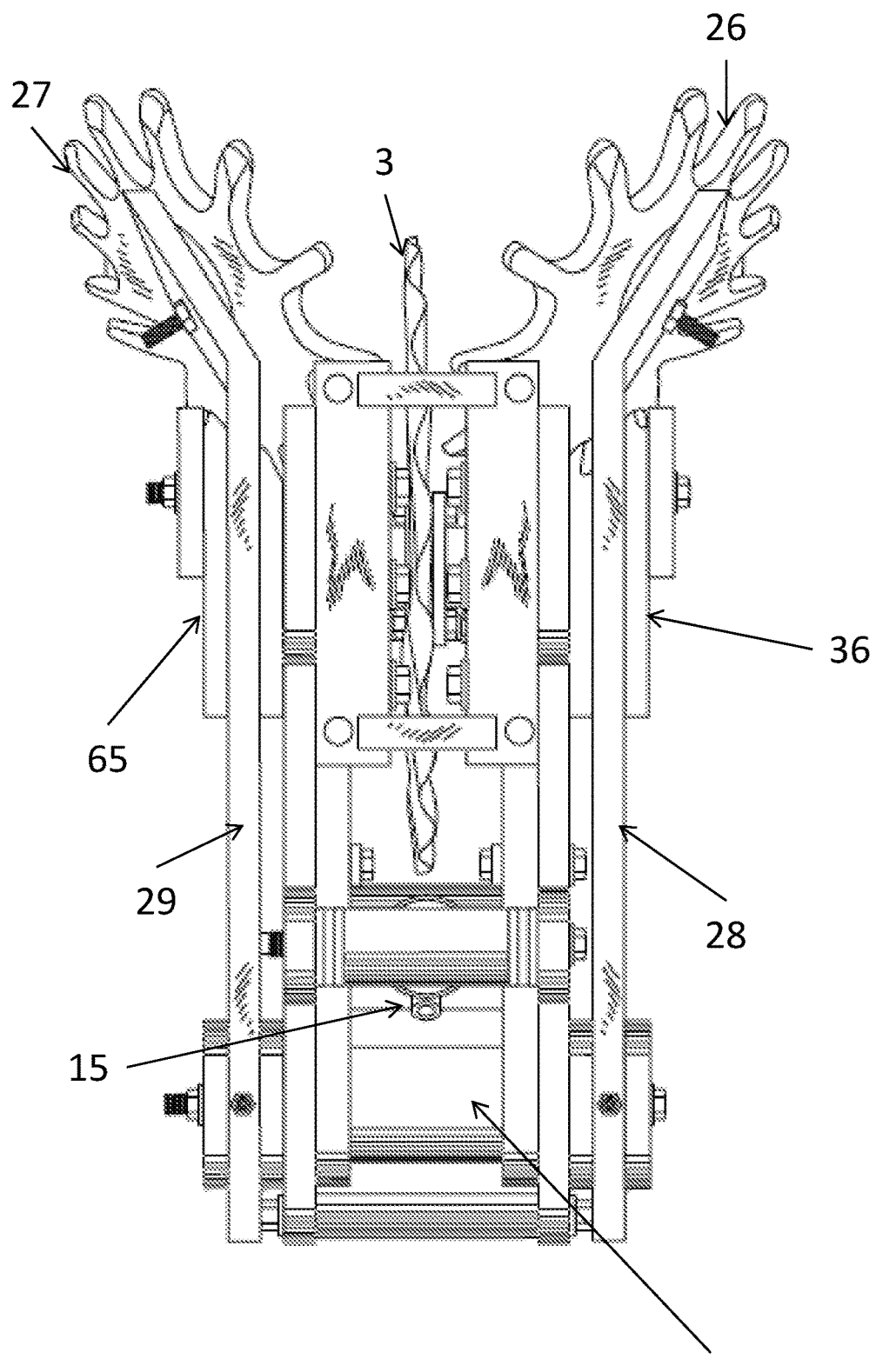
Figure 10:
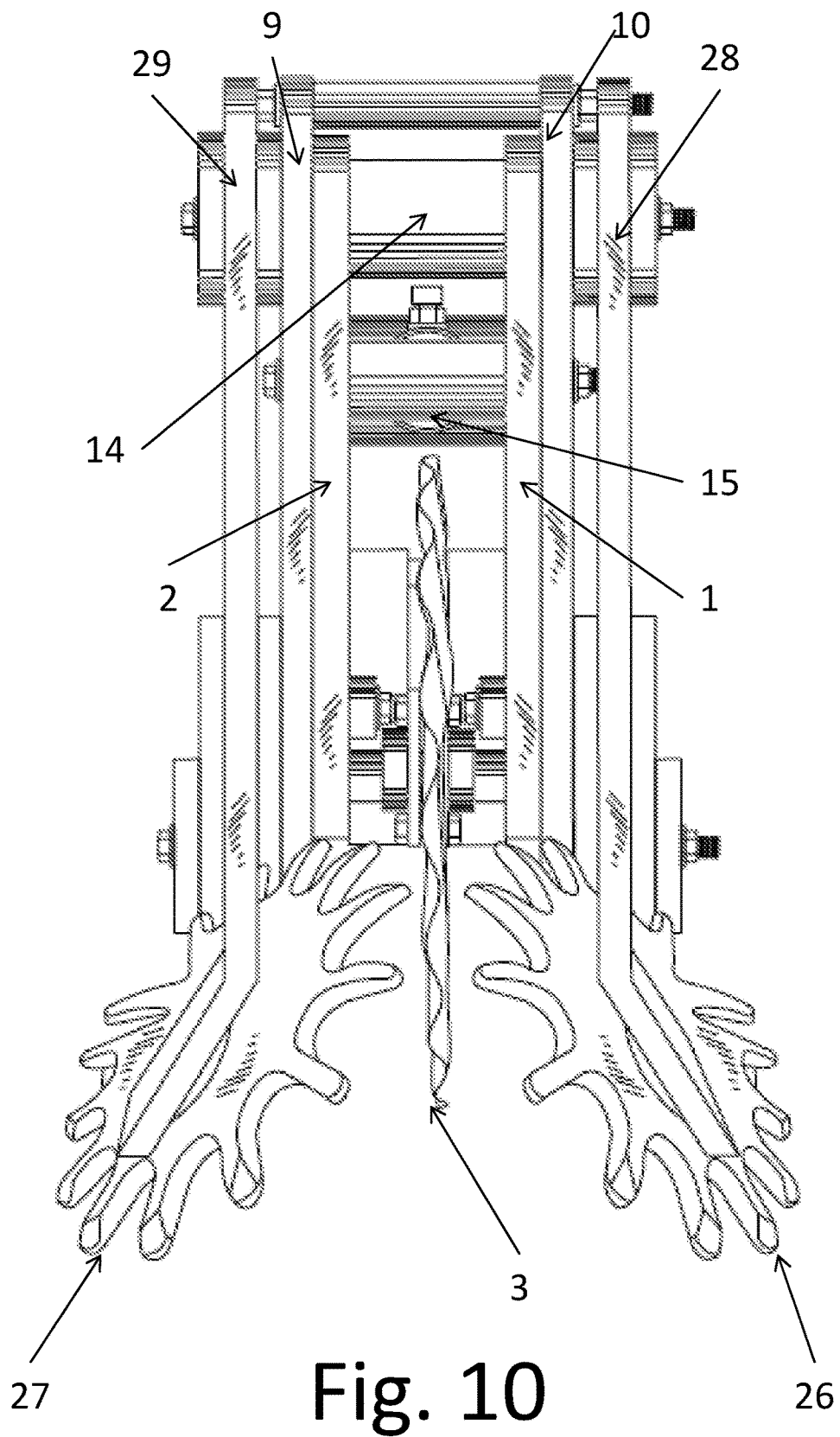
Figure 11:
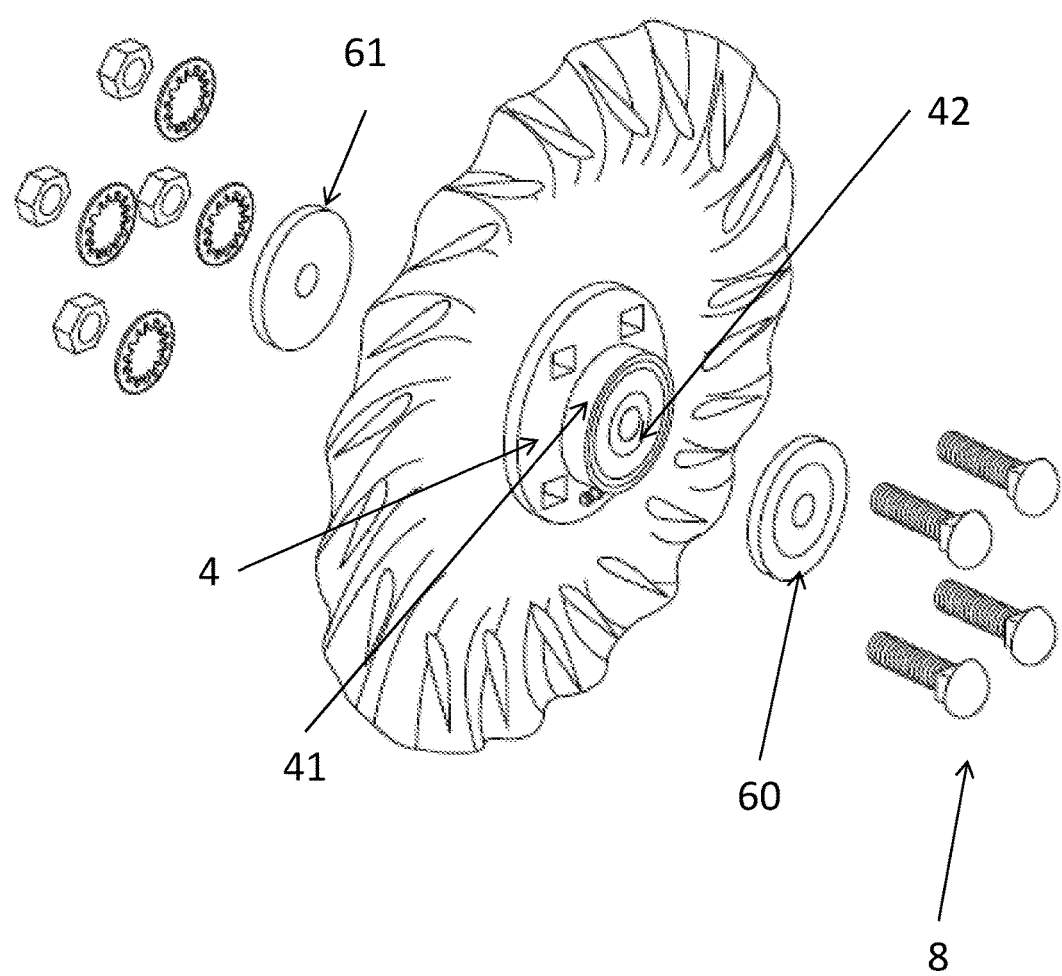
FIG. 11 is an exploded view of the hub seal and dirt shield used by the device of the present invention to retain a coulter.
Figure 12:
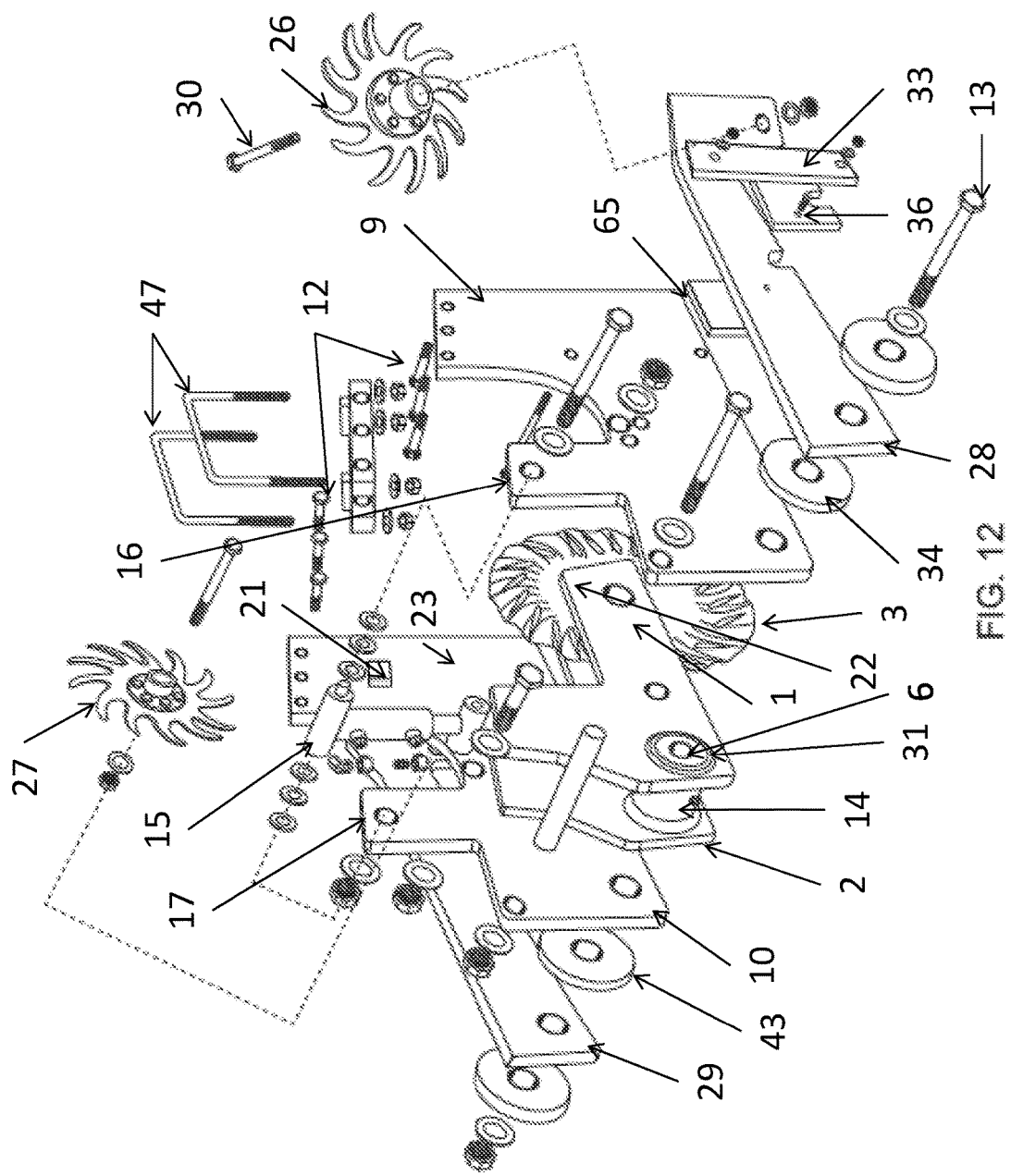
FIG. 12 is an exploded view of the device of the present invention.

In another embodiment, a second hydraulic cylinder 24 as shown in FIG. 2 can be added to the device. In this embodiment, the second/secondary hydraulic cylinder can be used for additional down pressure or to raise the coulter wheel 3 out of the way for planting situations where they are not needed.

The hydraulic system provides for a static pressure, unlike spring loaded wheels which create an increasing, dynamic pressure on the wheel 3, and machine frame 25 resulting in damage. FIG. 1 illustrates a typical hydraulic system 85 used by the present invention. The hydraulic system of a tractor 86 is connected to a 12v solenoid valve 87 using a check valve 88 to ensure no reverse flow of the hydraulic fluid back to the tractor except for that directed to the tractor via the return line 89. Twelve volt power from the tractor 90 controls the 12v solenoid valve. A pressure gauge 91 located on the machine and/or in the tractor cab is used to view, set, and monitor the pressure to the individual cylinders 92 of each device, when a plurality of devices are used on a machine. The accumulator 19 is gas charged to ensure constant, static pressure on each cylinder as previously described.

As shown in table 1, through experimentation it has been found that the present invention provides a static or steady downward pressure force compared to spring loaded wheels currently used on machines in the prior art. A wheel has approximately 8 inches of travel before its motions is stopped, as shown in table 1, the typical spring loaded wheel in the prior art experiences an exponential increase in pressure as the wheel is pushed through its range of travel when impacting an object while the present invention maintains a consist, lower pressure that is much less likely to cause damage to the wheel, machine, or components.

TABLE 1

Comparison of Wheel Pressure of the Present Invention Versus a Spring Loaded Wheel.

| Wheel Soil Depth (inches) | Pressure of the Present Invention (pounds) | Pressure of spring loaded wheel (pounds) | Percentage of Increased Pressure on a Spring Loaded Wheel |
|---|---|---|---|
| 2 in. | 400 lbs. | 400 lbs. | 0% |
| 4 in. | 405 lbs. | 600 lbs. | 150% |
| 6 in. | 420 lbs. | 900 lbs. | 225% |
| 8 in. | 415 lbs. | 1200 lbs. | 300% |

In another embodiment, the device of the present invention is further comprised of one or more trash wheels 26 and 27. As shown in the figures, adjacent and parallel to the outer plates 9 and 10, an additional pivoting trash wheel arms 28 and 29 are shown. This pivoting trash wheel arms 28 and 29 are bolted to the outer plates 9 and 10 and inner plates 1 and 2 using a single bolt 30 going through the front pivot hole 31 and bearing 6 of the inner plates 1 and 2. A retaining bar 33 bolted to the outer plate 9 above and below the pivoting trash wheel arm 29 limits both vertical and horizontal movement. One or more spacers 34 are used to create a gap 35 between the pivoting trash wheel plate 28 and the outer plate 10. Plastic wear panels 36 are bolted to the outer plates 9 and 10, retaining bar 33, and pivoting trash wheel arms 28 and 29 to create a wear surface that can be easily and quickly repaired or replaced due to friction between the moving plates and pivoting trash wheel arms 28 and 29. The trash wheels 26 and 27 are bolted to the opposing end 37 of the pivoting trash wheel arms 28 and 29 and pivoting retaining bolt 38. The trash wheels 26 and 27 can be bolted parallel to the coulter wheel 3 or at any desired angle. The outer plates 9 and 10 can also be provided with stops 40 to limit the up and down motion of the trash wheels 26 and 27.

The hub 4 of the preset invention for attaching the coulter wheel 3 to the inner plates 1 and 2 is comprised of a plurality of bolts 8 that attached the hub 4 to the wheel 3. The hub 4 is further comprised of a sealed bearing 41 that is recessed within the body 42 of the hub 4. This recess 42 allows for a dirt shield 43 to be placed over the sealed bearing 41 and retained within the recess 42. The resulting flat surface provides no corners or surfaces for catching and collecting dirt, debris, or other organic matter from the ground as the coulter wheel 3 rotates. Additionally, providing a recess 42 for the dirt shield 43 makes it extremely difficult for dirt to enter the hub 4 and even more unlikely to migrate under the dirt shield 43 and across the bearing surface to damage or increase bearing wear, which are common in other hub designs that use an overlapping dirt shield which covers the sealed bearing and overlaps the hub surface, which are commonly packed with dirt and debris as well as exacerbating a condition where the wheels can be bound or wrapped up by organic matter and fail to rotate.

The device 45 of the present invention is a replacement for a standard spring loaded coulter wheel 44 on a corn planter 46 or any similar agricultural or farming machine. The device 45 is attached to the machine frame 25 using U-bolts 47 in the same manner as the spring loaded coulter wheels. The device 45 is also connected to the hydraulic system of the pulling tractor 48 to provide the necessary pressure and force on the hydraulic cylinder 15 required for proper operation.

Figure 13:
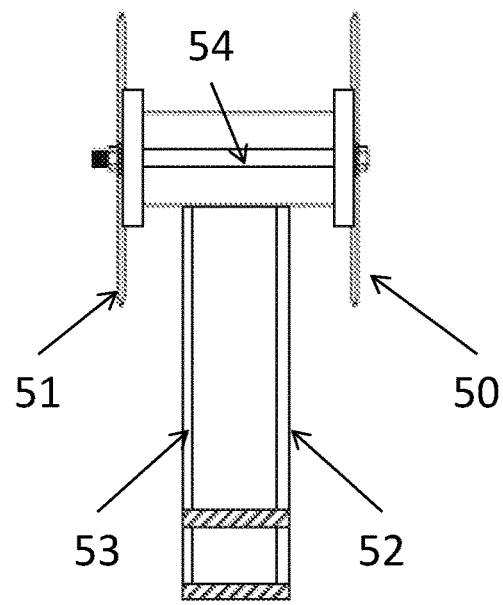
FIG. 13 is a planar view of a double wheel embodiment of the present invention.

In another embodiment shown in FIG. 13, the present invention can be adapted to use two coulter wheels 50 and 51. In this embodiment, the present invention is modified so that two or more coulter wheels 50 and 51 can be used per device 49. In this embodiment, the device 49 is comprised of a pair of inner plates 52 and 53 which are mounted to an axle shaft 54, the axle shaft 54 is mounted to a pair of coulter wheels 50 and 51 by a hub 55 mounted on each opposing end 56 and 57 of the axle shaft 54 against one side of a coulter wheel 58, a bearing 59, and dirt shields 60 and 61. The two inner plates 52 and 53 are retained within two outer plates 62 and 63 as in other embodiments of the present invention.

Figure 14:
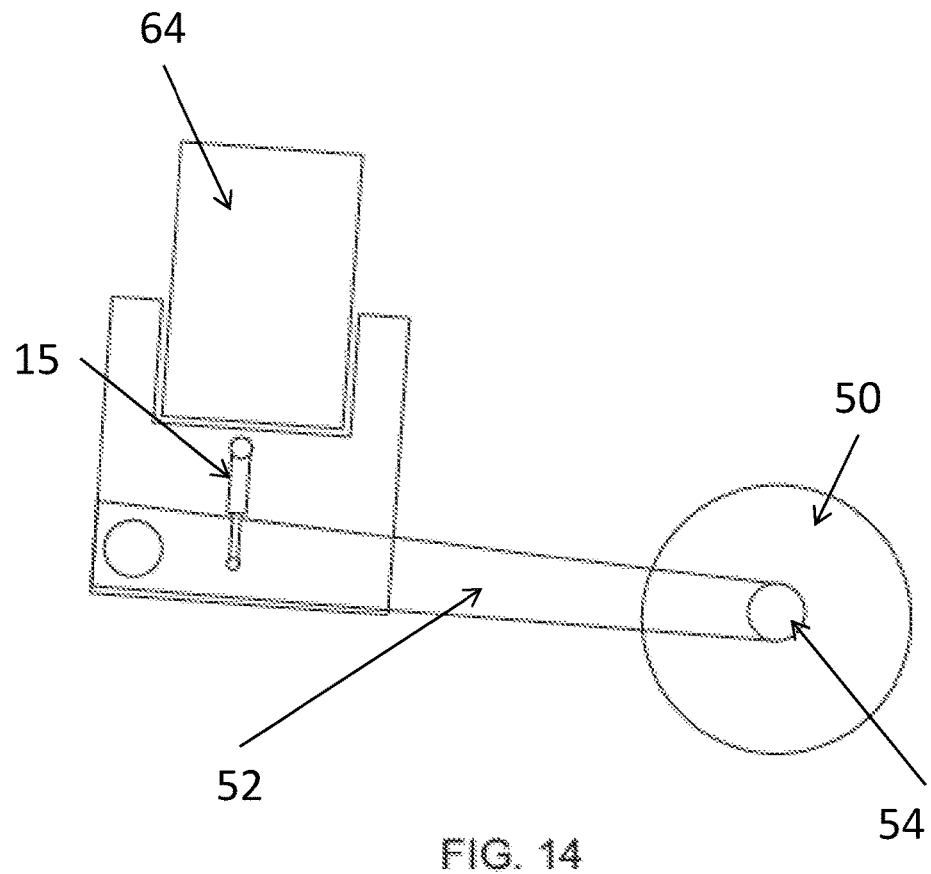
FIG. 14 is a planar view of a embodiment adapted for use on a vertical till machine.
Figure 15:
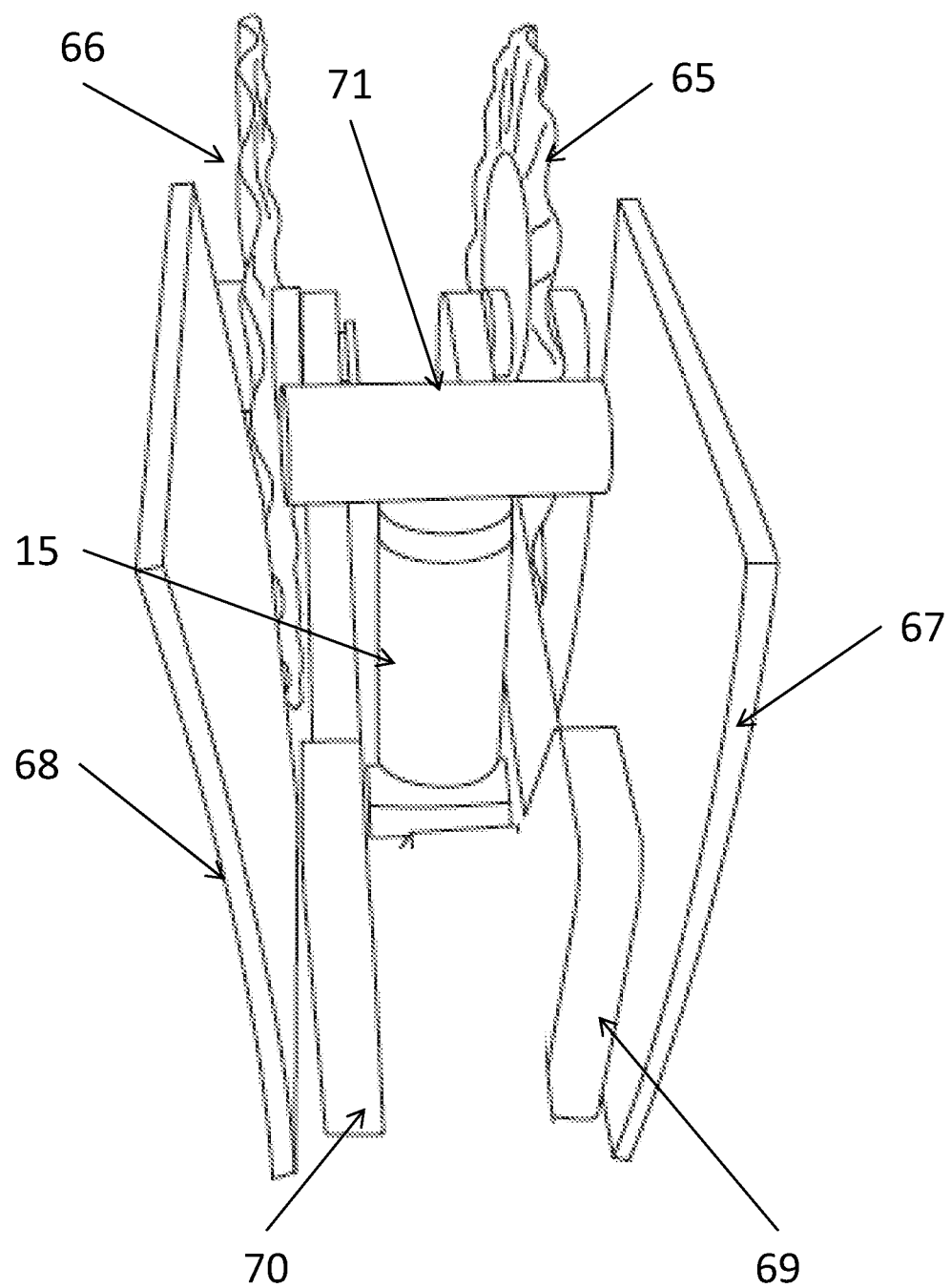
FIGS. 15-18 29 illustrate a second double wheel embodiment of the present invention where the wheels are controlled by a single hydraulic cylinder.
Figure 16:
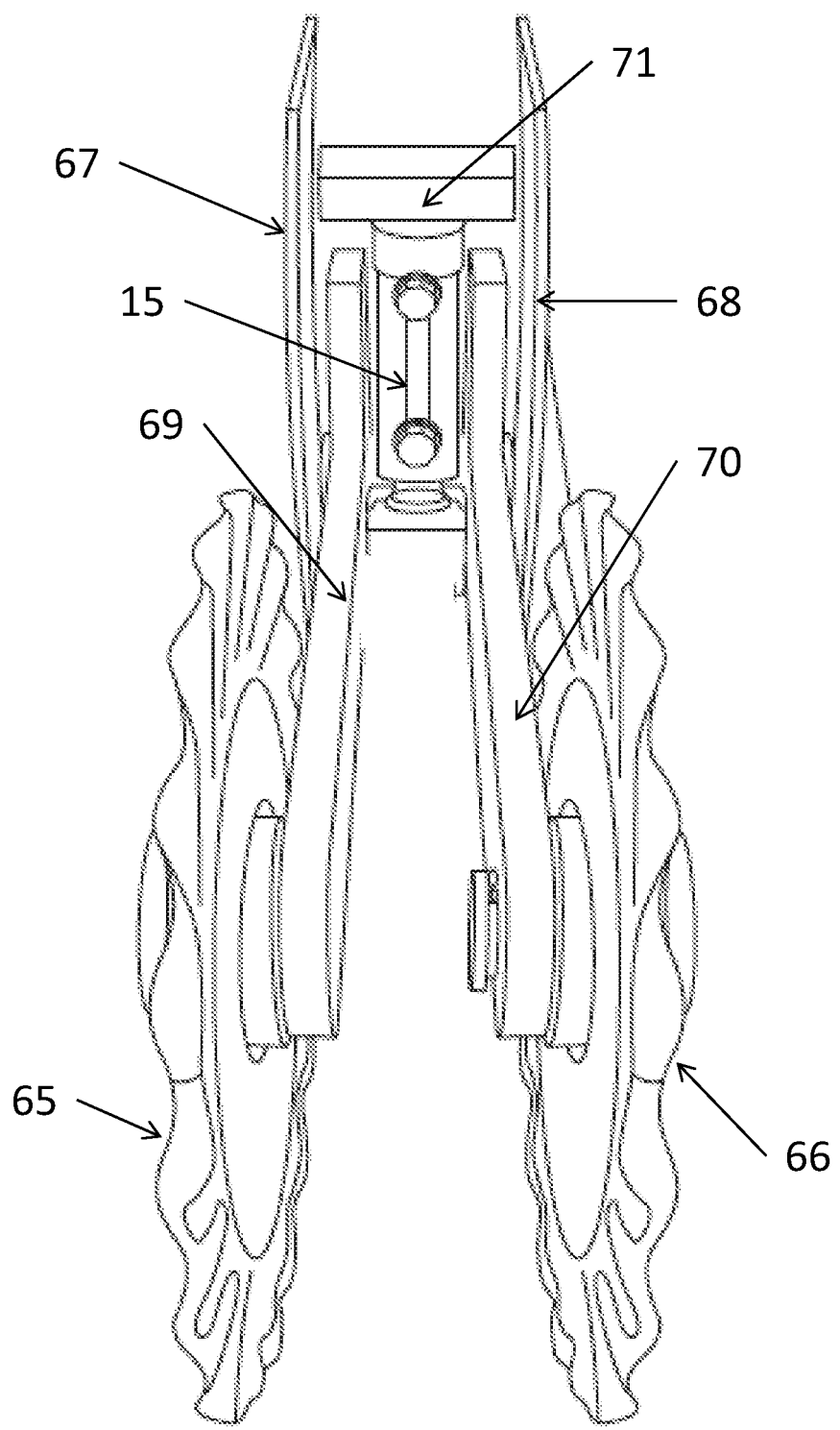
Figure 17:
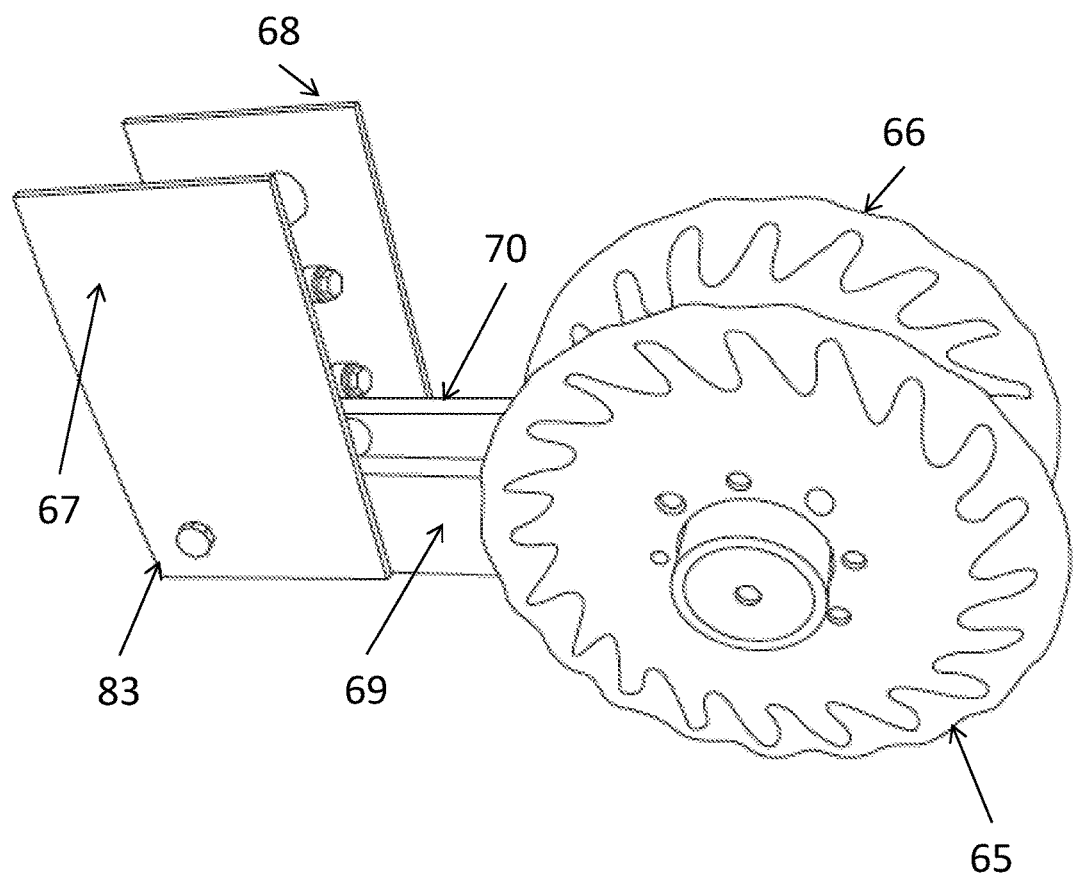
Figure 18:
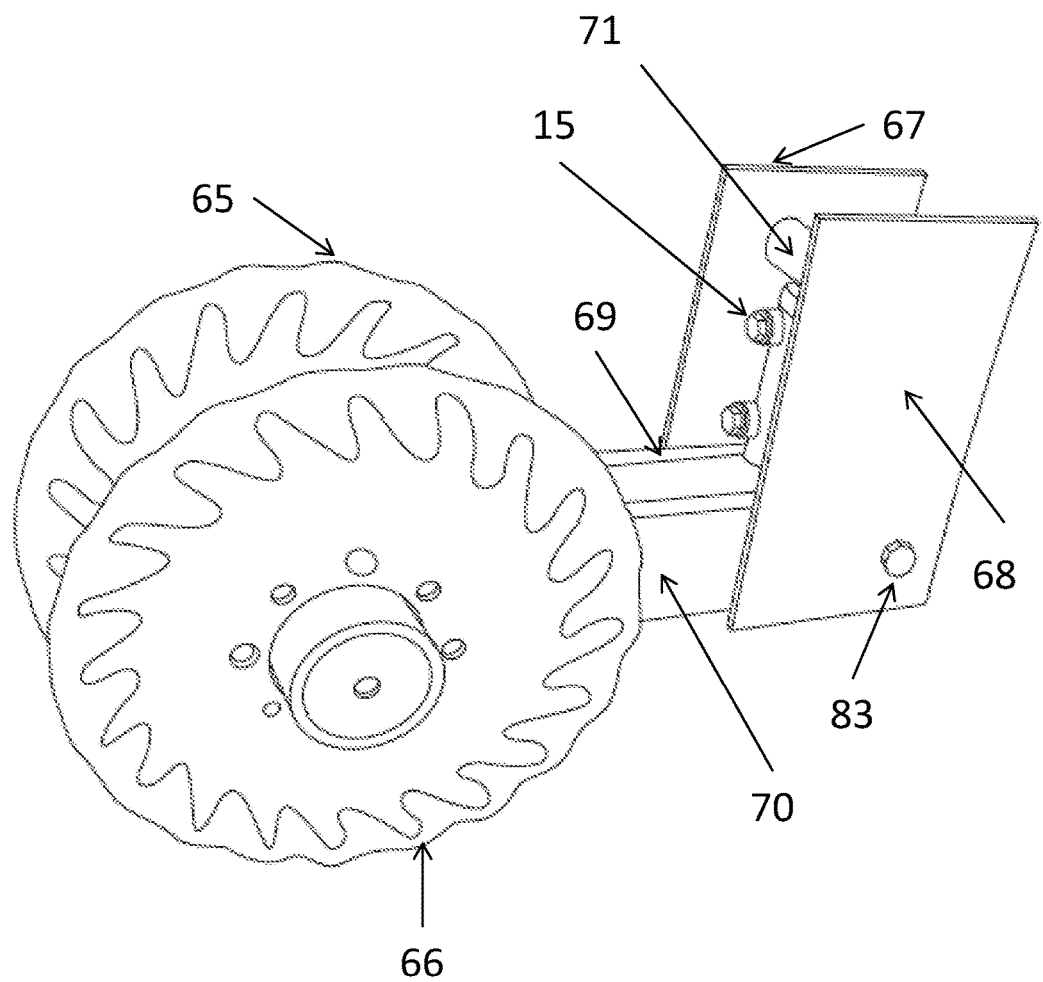
Figure 19:
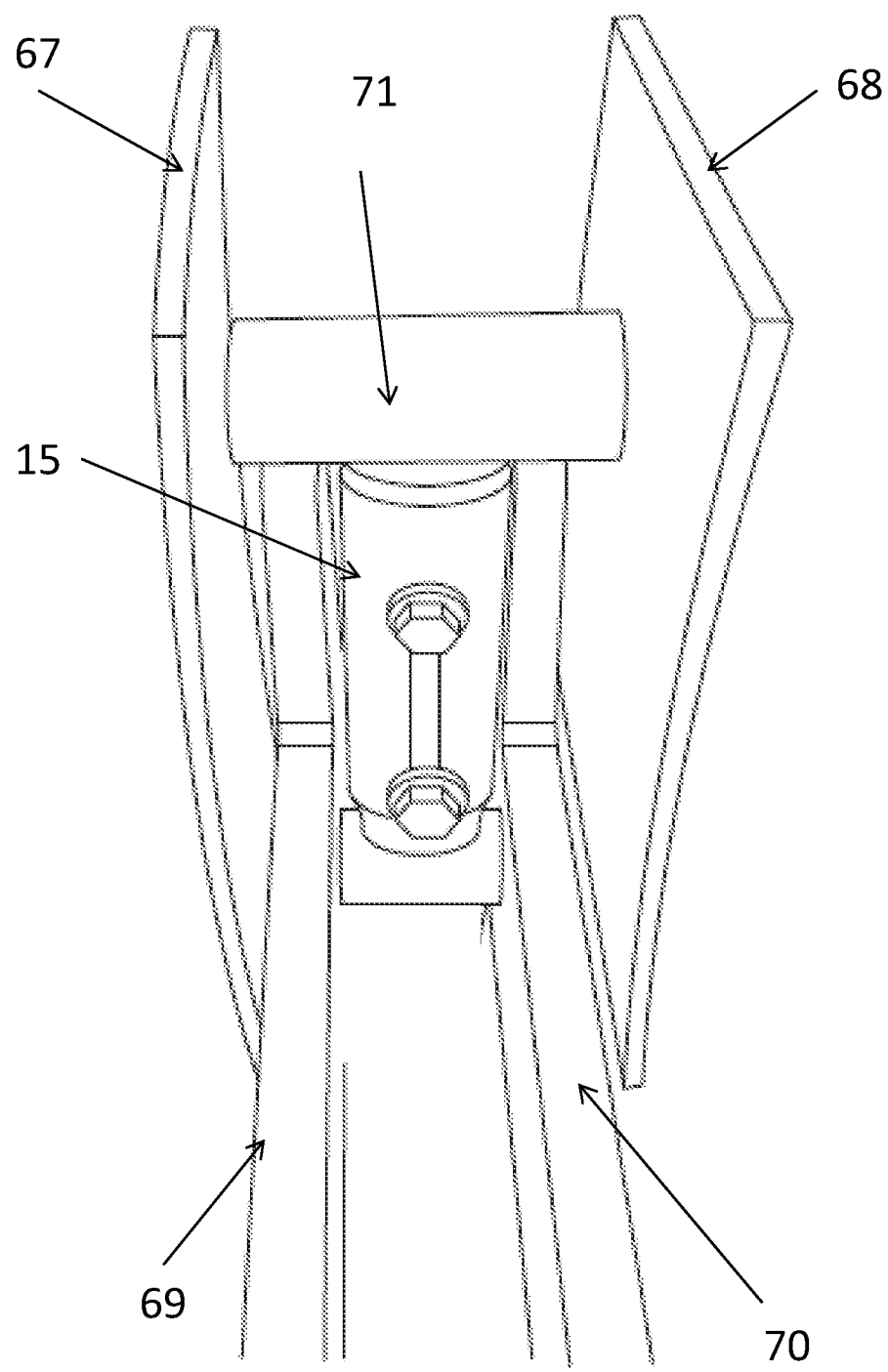
Figure 20:
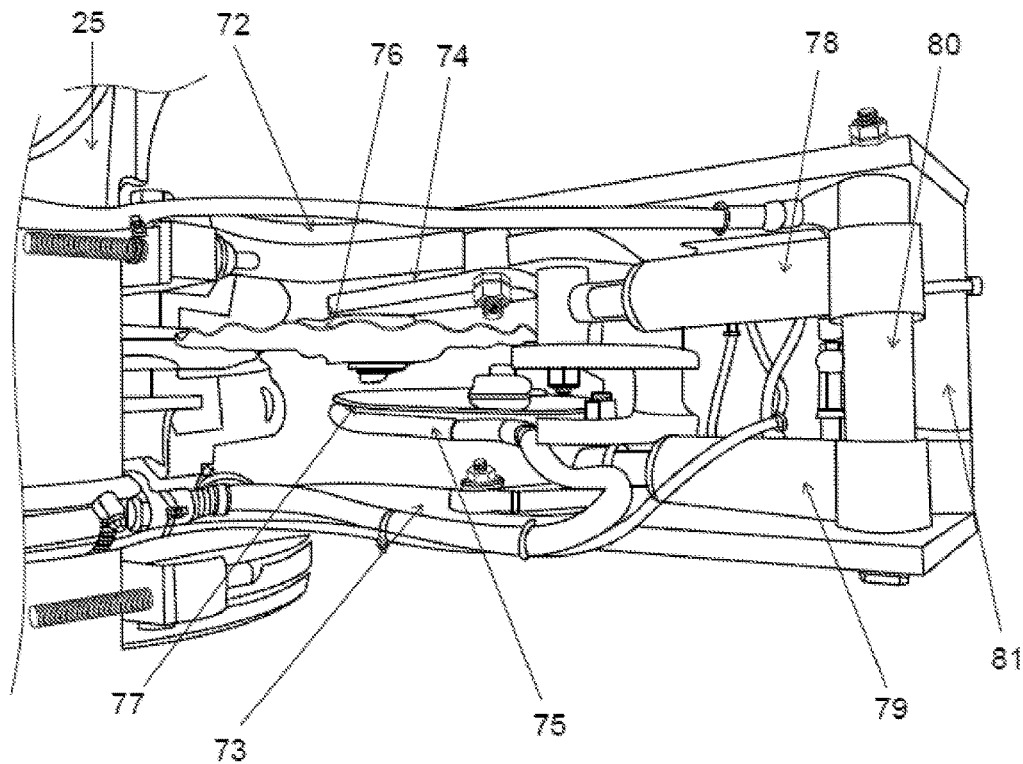
Figure 21:
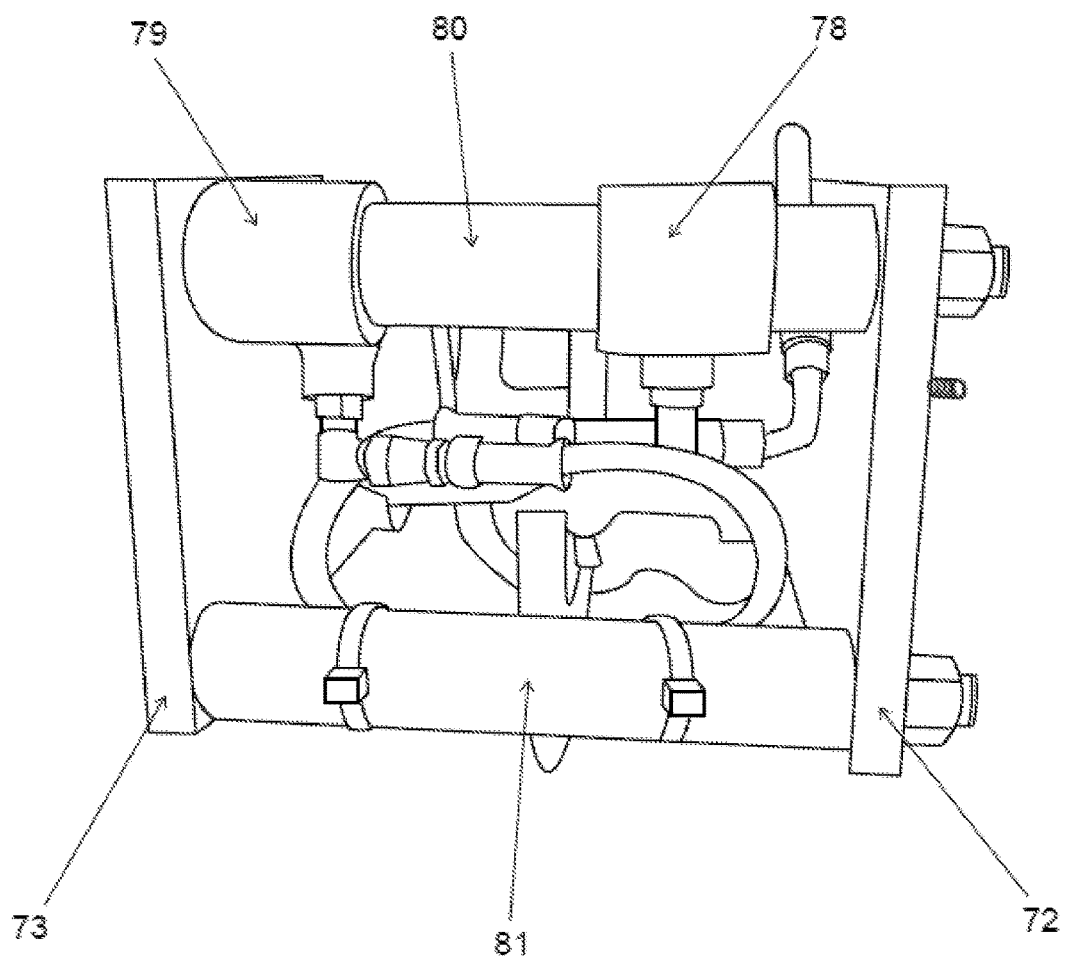

In another embodiment of the present invention shown in FIG. 14, the present invention is modified for use on a vertical till machine. In this embodiment, the inner plates 52 and 53 are extended beyond the outer plates 62 and 63 and the hydraulic cylinder 15 is re-positioned to accommodate fame 64 mounting where the hydraulic cylinder 15 is mounted in a location underneath the frame 64 of the vertical till machine instead of forward of the frame 25 as shown in previous embodiments for use on a corn planter. The same device components are used, but in a slightly different arrangement to accommodate the differences in the machines.

In another embodiment shown in FIGS. 15-18, the present invention can be adapted to use two coulter wheels 65 and 66 with independent wheel arms 69 and 70. The independent wheel arms 69 and 70 are affixed to plates 67 and 68. The cylinder 15 is connected on one end to the plates 67 and 68 by a shaft 71 which secures the cylinder 15 to the plates 69 and 70 by a bolt creating a pivot shaft 83. The opposing end of the cylinder 15 is connected to the independent wheel arms 69 and 70 using a second shaft, which when the cylinder is cycled in and out creates a corresponding up and down motion of the opposing arm ends and wheels 65 and 66.

FIGS. 19-23 illustrate yet another embodiment of the present invention teaching an independent two wheel version of the invention. In this embodiment, the plates 73 and 74 are still attached to two pivoting wheel arms 74 and 75, each with a corresponding wheel 76 and 77. In this embodiment, each of the wheel arms 74 and 75 is controlled by a corresponding hydraulic cylinder 78 and 79, where the extension or compression of the hydraulic cylinders 78 and 79 correspond to an up and down movement of the corresponding wheels 76 and 77. The plates 73 and 72 are secured to each other by a first, fixed cylinder 81, and a second, fixed, cylinder 80 connecting the plates 73 and 74 together and maintaining a fixed distance between the plates 73 and 74. The second, fixed cylinder 80 also provides the fixed mounting points for the two hydraulic cylinders 78 and 79.

Figure 22:
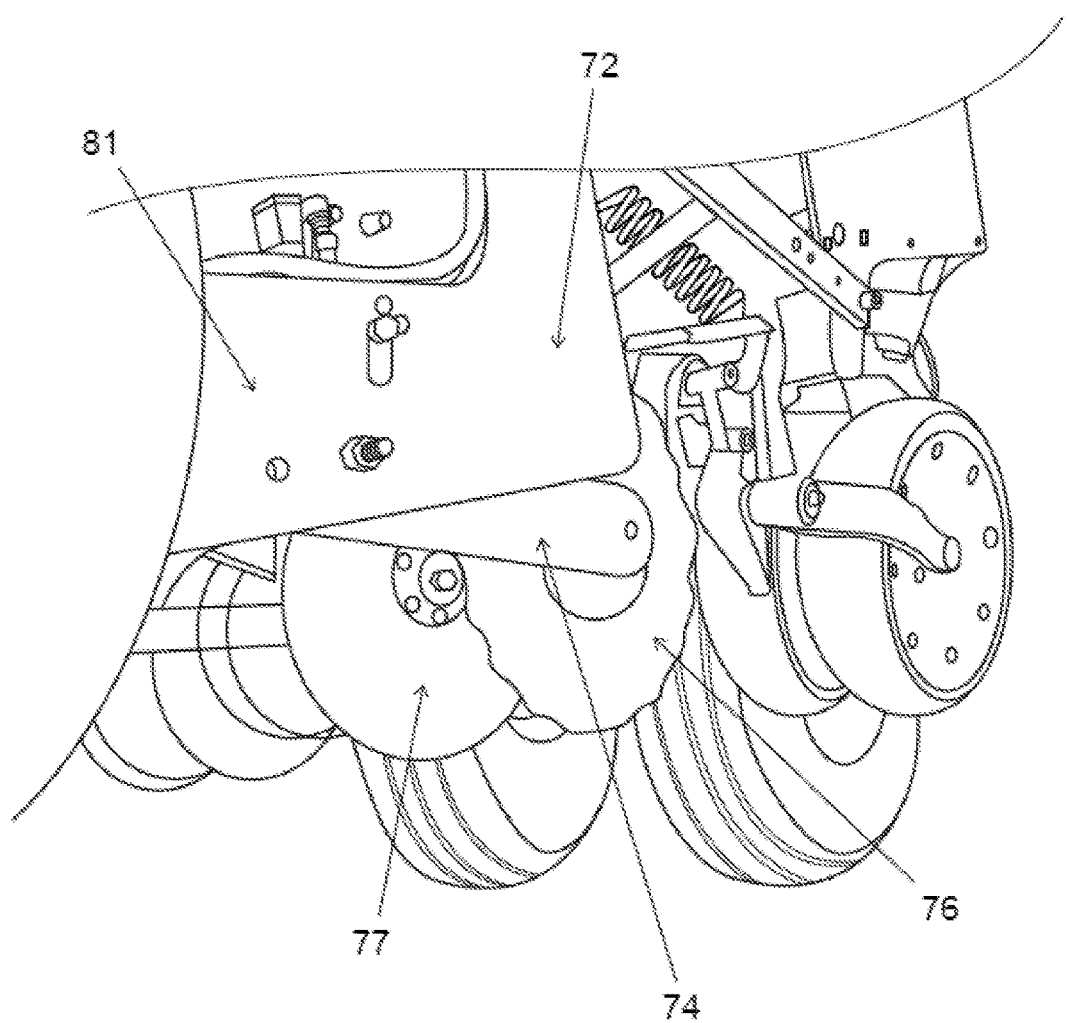
Figure 23:
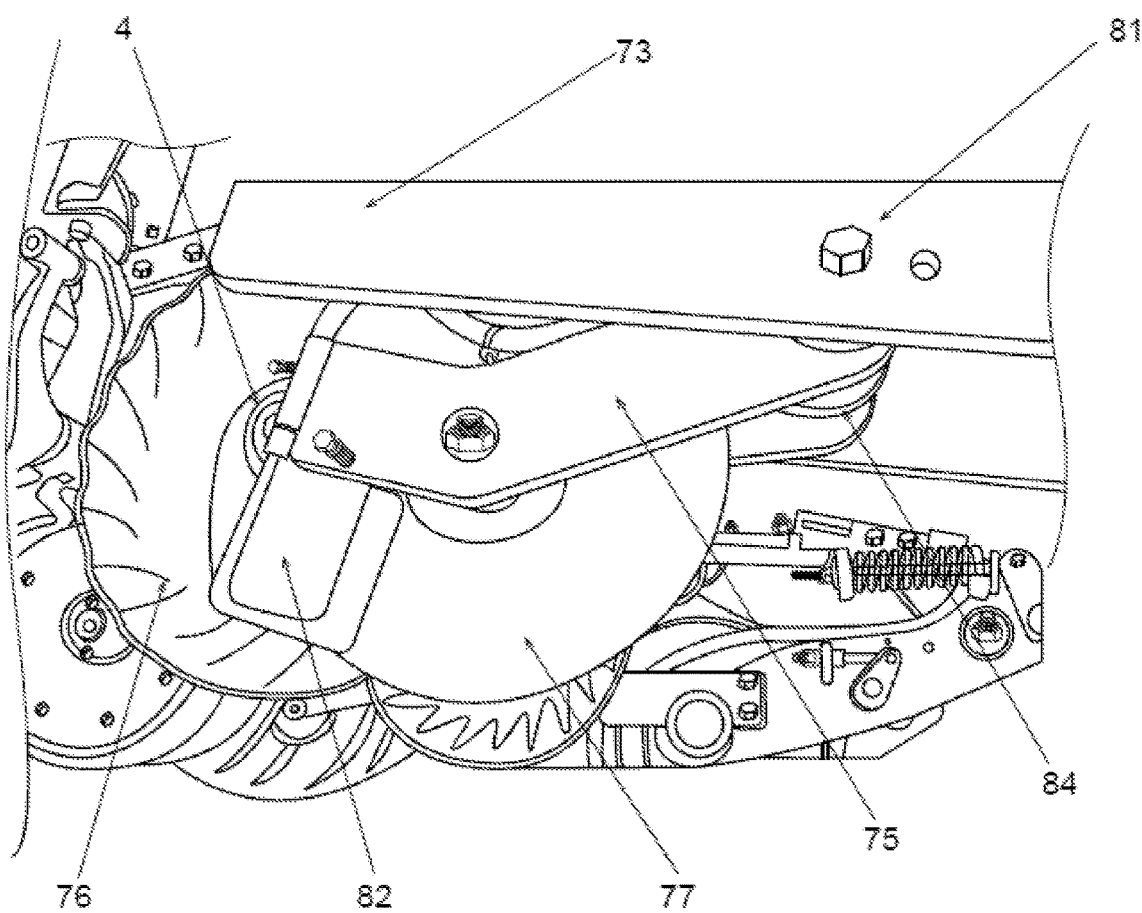
Figure 24:
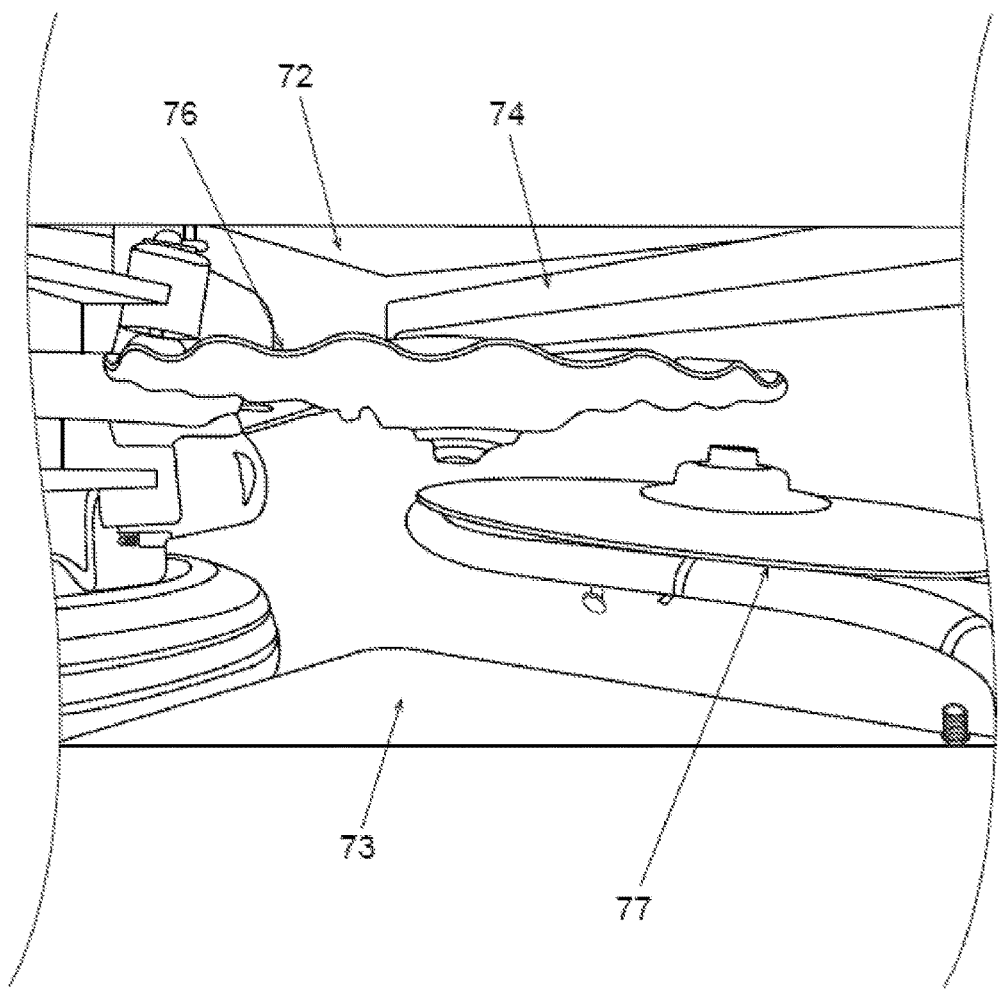
Figure 25:
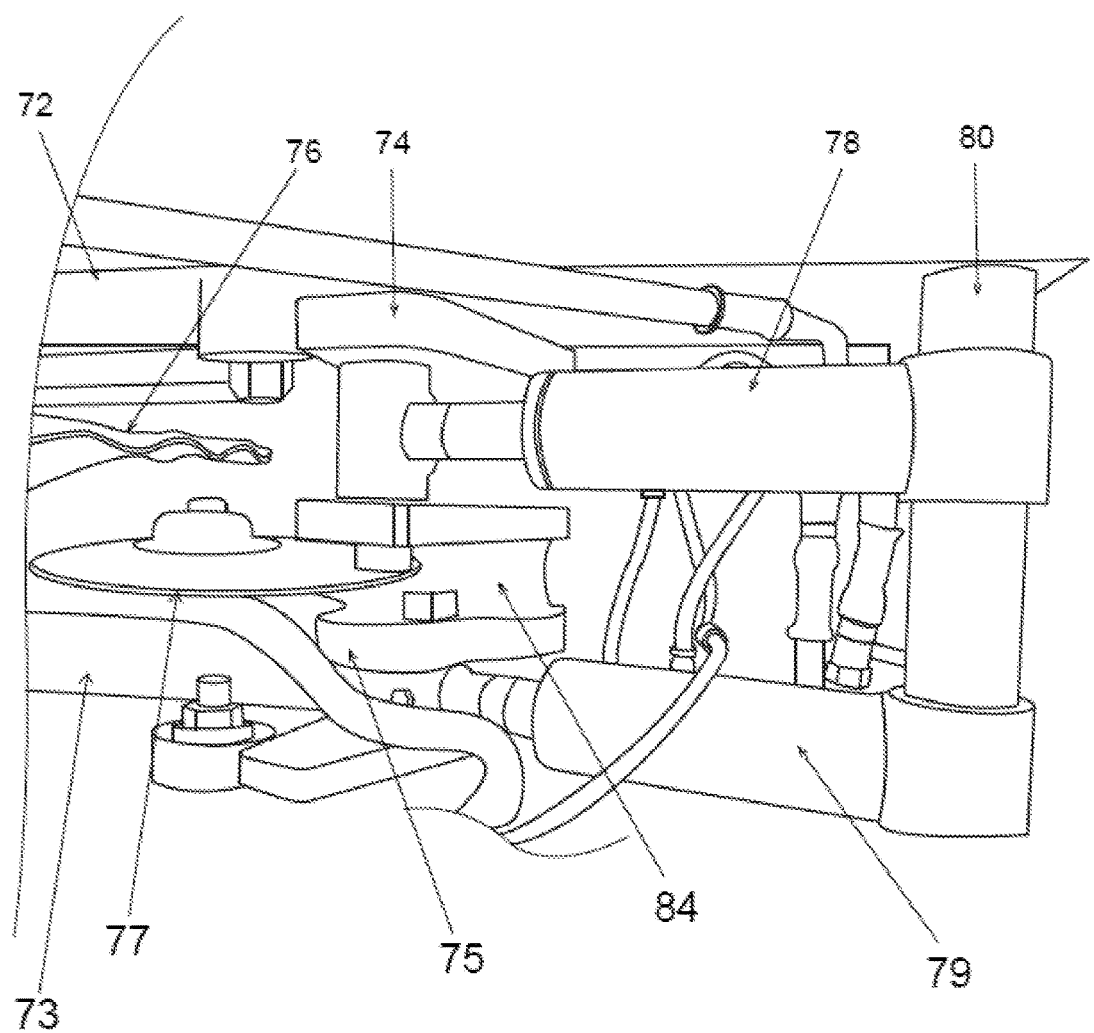
Figure 26:
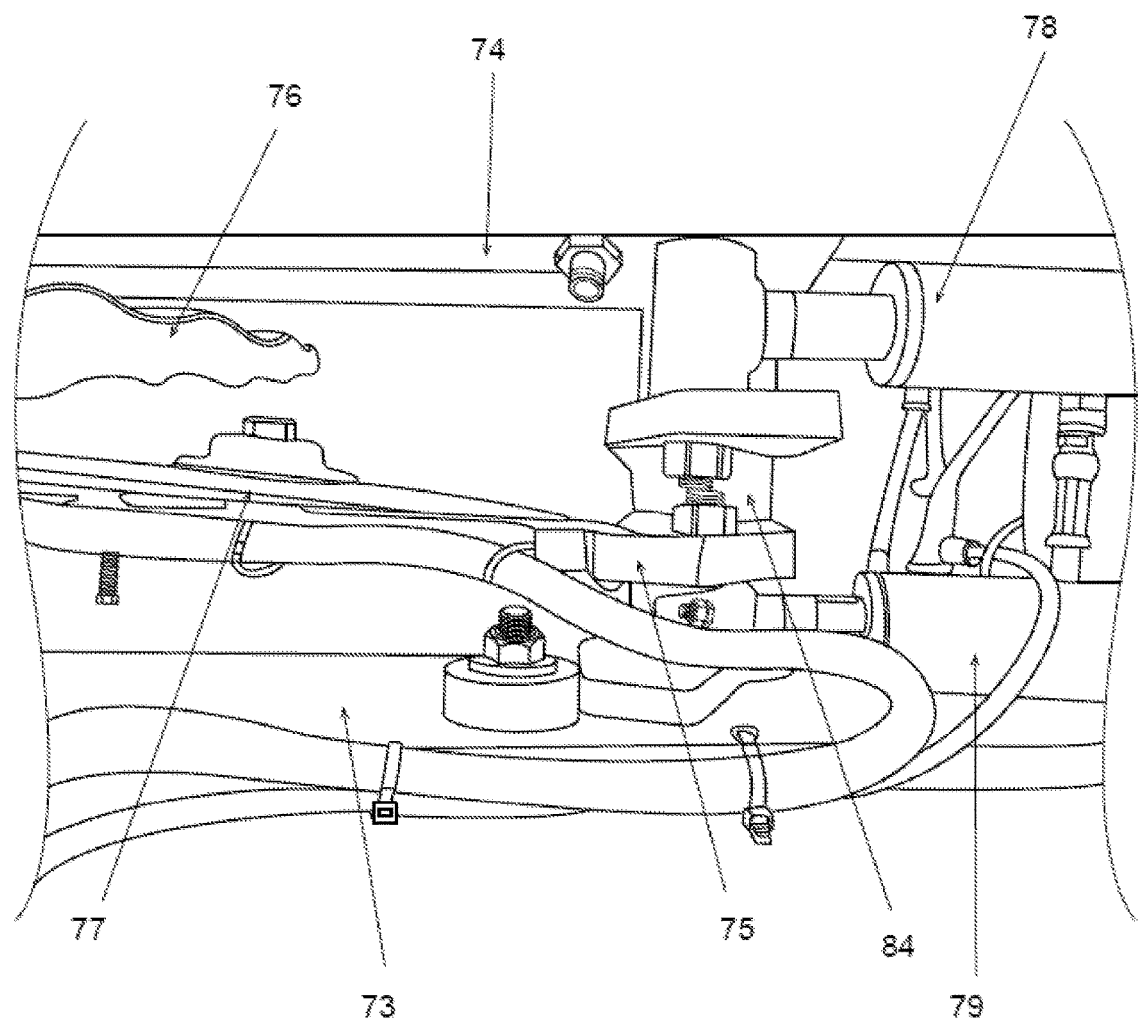
Figure 27:
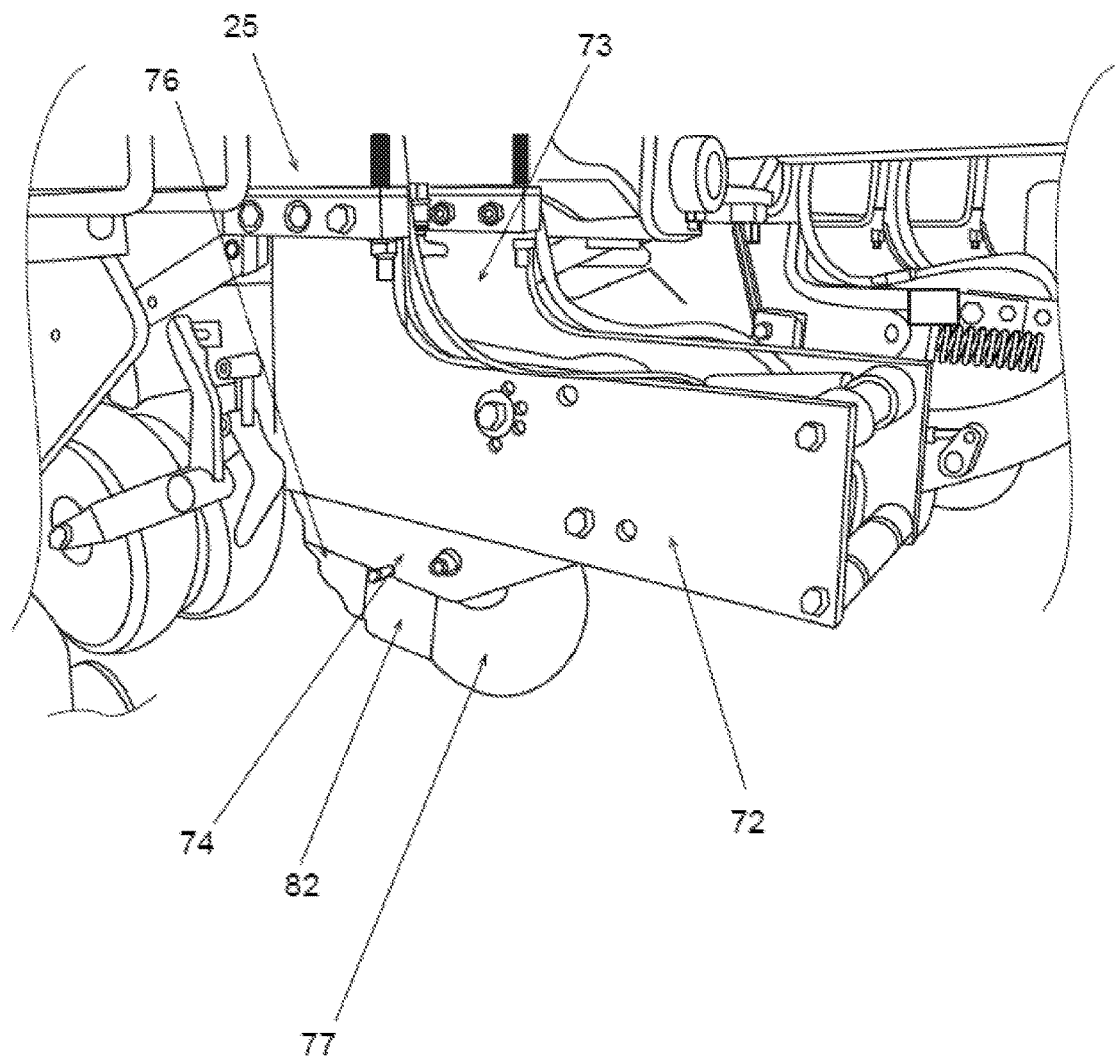
Figure 28:
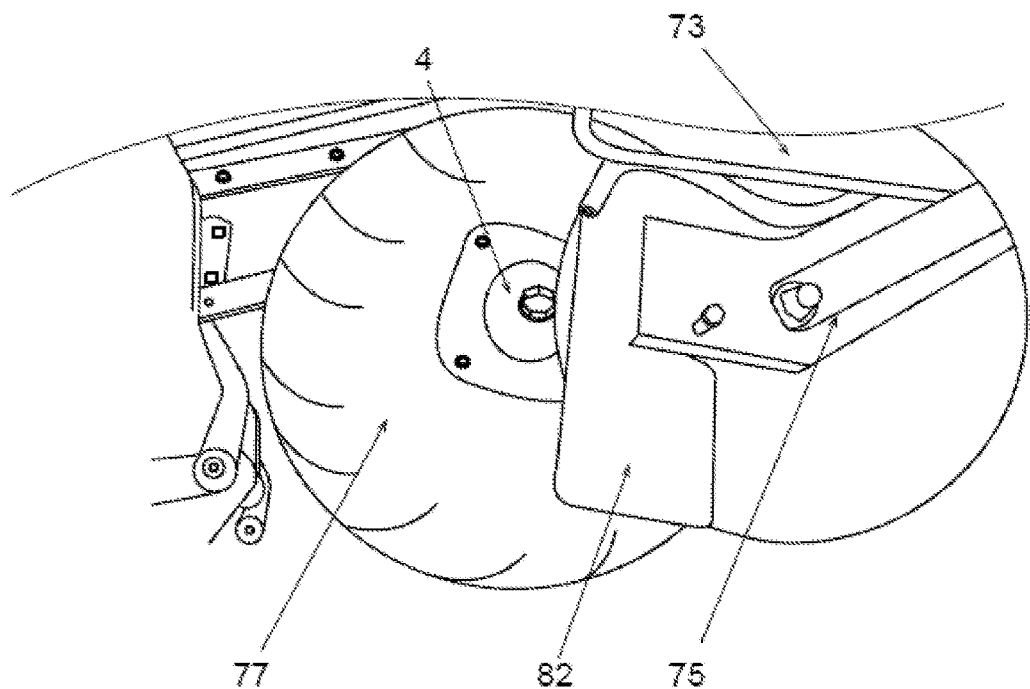
Figure 29:
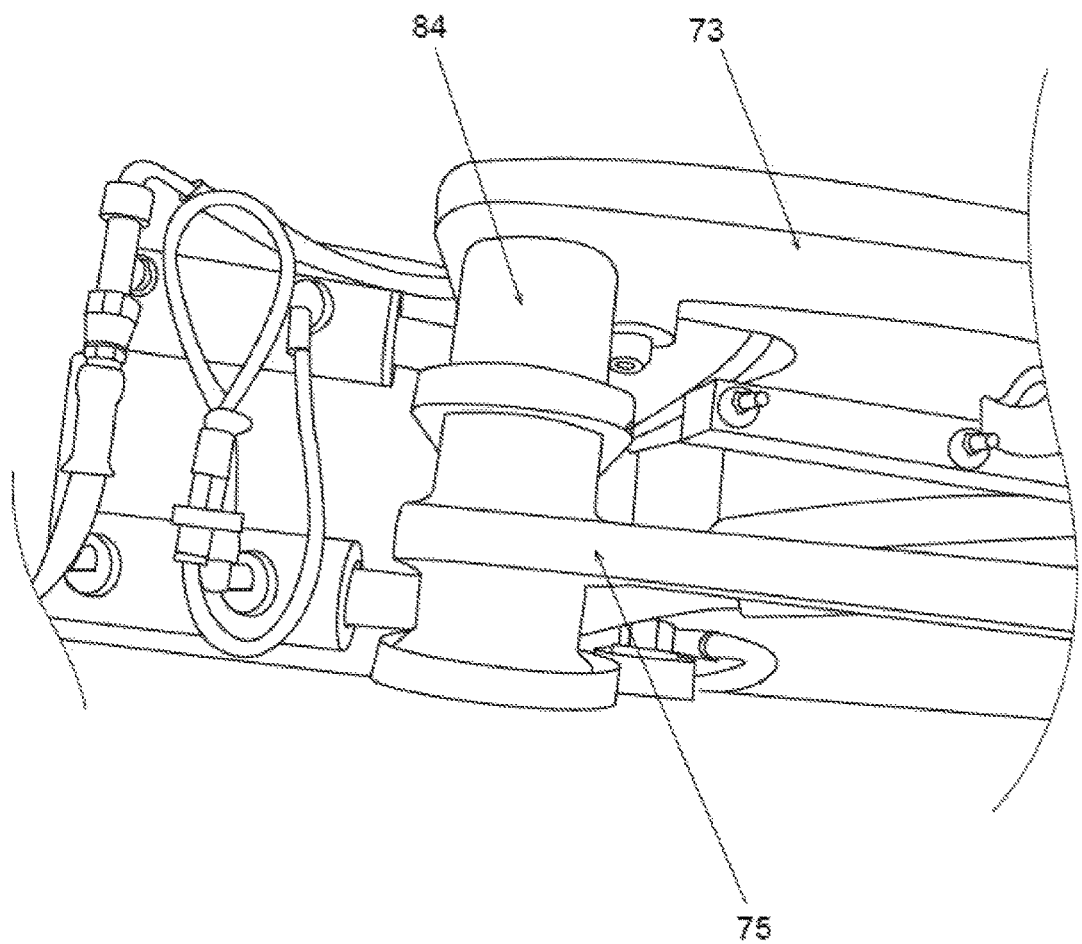

A third fixed cylinder 84 keeps the plates 73 and 74 at a fixed distance while also providing the pivot point for the wheel arms 74 and 75 where the extension or compression of the hydraulic cylinders 78 and 79 correspond to an up and down movement of the corresponding wheels 76 and 77 as shown in FIG. 22. In this embodiment, the same hub 4 as previously taught is used, and the wheel arms 74 and 75 can also be affixed with a cleaner bar 82 running parallel to the blades removing excess dirt and debris as the blades rotate, so as to reduce the amount of dirt and debris traveling around the blades and potentially jamming the blade rotation if it builds up and becomes lodged between the blades.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A device for providing an agricultural ground working implement with down pressure and protective hydraulic cushion for obstacle impact comprising:
   a pair of inner plates which are removably mounted to a coulter wheel by a hub bolted to the two inner plates on one end and a bearing on an opposing end;
   the two inner plates are retained within two outer plates;
   the two outer plates are removably attached on one end by a plurality of bolts, opposite the working surface of the coulter wheel with respect to where it would contact the ground;
   a pivot bolt connects the outer plates to the inner plates on an opposing end from the coulter wheel;
   a double acting hydraulic cylinder is removably mounted between two tabs located on the outer plates and the opposing end of the double acting hydraulic cylinder is mounted between the inner plates adjacent to the pivot bearing and opposite the coulter wheel;

the double acting hydraulic cylinder is connected to a hydraulic accumulator;

one or more trash wheels adjacent and parallel to the outer plates oriented to trail the coulter wheel when the device is in use;

a first pivoting trash wheel arm is bolted to a first outer plate and a first inner plate using a single bolt going through a front pivot hole and pivot bearing of the first inner plate;

a second pivoting trash wheel arm is bolted to a second outer plate and a second inner plate using a single bolt going through a front pivot hole and pivot bearing of the second inner plate;

a retaining bar bolted to the outer plates above the pivoting trash wheel arm limits both vertical and horizontal movement of the pivoting trash wheel arm with respect to the outer plate to which they are attached;

one or more spacers are used to create a gap between a pivoting trash wheel plate and the outer plates;

plastic wear panels are bolted to the outer plates, retaining bar, and pivoting trash wheel arms to create a wear surface that can be easily and quickly repaired or replaced due to friction between the moving plates and pivoting trash wheel arm; and the trash wheels are bolted to the opposing end of the pivoting trash wheel arm with a pivoting retaining bolt.

2. The device of claim 1, wherein the trash wheels are bolted parallel to the coulter wheel or at any desired angle; and the outer plates are provided with motion limiting blocks located on their inner surfaces to limit the up and down motion of the coulter wheels;

these motion limiting blocks are engaged by the inner plates as the coulter wheel rises in response to an obstacle impact so that the wheel can not become damaged by the machine frame in the event a surface obstacle is encountered by the machine.

3. The device of claim 1, wherein the device is attached to the machine frame using U-bolts; and the device is located directly under the frame.

4. The device of claim 1, wherein the device is connected to the hydraulic system of a pulling tractor to provide the necessary pressure and force on the double acting hydraulic cylinder required for proper operation.

5. The device of claim 1, wherein the device is a replacement for a standard spring loaded coulter wheel on a corn planter or any agricultural or farming machine.

6. The device of claim 1, wherein the hub for attaching the coulter wheel to the pair of inner plates is comprised of a plurality of bolts that attached the hub to the wheel;

a sealed bearing that is recessed within the body of the hub;

a dirt shield placed over the sealed bearing and retained within the recess; and wherein the dirt shield and body create a flush surface where they intersect.

* * * * *